US011632578B2

(12) United States Patent
Hwang et al.

(10) Patent No.: US 11,632,578 B2
(45) Date of Patent: *Apr. 18, 2023

(54) APPARATUS AND METHOD FOR CONFIGURING CONTROL MESSAGE IN BROADCASTING SYSTEM

(71) Applicant: Samsung Electronics Co., Ltd., Suwon-si (KR)

(72) Inventors: Sung-Oh Hwang, Yongin-si (KR); Kyung-Mo Park, Seoul (KR); Sung-Ryeul Rhyu, Yongin-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,432

(22) Filed: Jul. 19, 2021

(65) Prior Publication Data

US 2021/0352339 A1 Nov. 11, 2021

Related U.S. Application Data

(63) Continuation of application No. 14/351,419, filed as application No. PCT/KR2012/008404 on Oct. 15, 2012, now Pat. No. 11,070,855.

(30) Foreign Application Priority Data

Oct. 13, 2011 (KR) .......................... 10-2011-0104892

(51) Int. Cl.
*H04N 21/236* (2011.01)
*H04N 21/6405* (2011.01)
(Continued)

(52) U.S. Cl.
CPC ........... *H04N 21/236* (2013.01); *B64D 29/00* (2013.01); *B64D 29/08* (2013.01); *B64D 33/00* (2013.01);
(Continued)

(58) Field of Classification Search
CPC ........... H04N 21/4349; H04N 21/6405; H04N 21/2596; H04N 21/5665
(Continued)

(56) References Cited

U.S. PATENT DOCUMENTS 8,250,619 B2 * 8/2012 Song .................. H04N 21/2665
725/51
2002/0083207 A1 6/2002 Andersen
(Continued)

FOREIGN PATENT DOCUMENTS

CN 1447333 A 10/2003
CN 1921359 A 2/2007
(Continued)

OTHER PUBLICATIONS

ISO/IEC JTC1/SC29/WG11 N11541, MPEG Media Transport (MMT) Context and Objective, Jul. 2010.
(Continued)

Primary Examiner — Jivka A Rabovianski
(74) Attorney, Agent, or Firm — Jefferson IP Law, LLP

(57) ABSTRACT

The present invention relates to an apparatus and a method for configuring a control message in a broadcasting system for supporting a multimedia service based on an internet protocol. To this end, control information to be recorded in a payload of a control message to be configured is generated based on a table selected from among a plurality of tables for defining the information related to the generation and consumption of a hybrid content when a message type of the control message to be configured is determined to be a type
(Continued)

for providing information related to the generation and consumption of a hybrid content. In addition, the information related to the type of the selected table is recorded in an optional field of the control message to be configured.

8 Claims, 10 Drawing Sheets

(51) Int. Cl.
| | |
|---|---|
| H04N 21/643 | (2011.01) |
| H04N 21/2381 | (2011.01) |
| H04L 12/18 | (2006.01) |
| H04N 21/6332 | (2011.01) |
| B64D 29/00 | (2006.01) |
| B64D 29/08 | (2006.01) |
| B64D 33/00 | (2006.01) |
| B64D 47/00 | (2006.01) |
| F02C 7/06 | (2006.01) |
| F02C 7/32 | (2006.01) |
| F16N 19/00 | (2006.01) |
| H04L 65/611 | (2022.01) |

(52) U.S. Cl.
CPC .............. *B64D 47/00* (2013.01); *F02C 7/06* (2013.01); *F02C 7/32* (2013.01); *F16N 19/00* (2013.01); *H04L 12/184* (2013.01); *H04L 65/611* (2022.05); *H04N 21/2381* (2013.01); *H04N 21/6332* (2013.01); *H04N 21/6405* (2013.01); *H04N 21/64322* (2013.01)

(58) Field of Classification Search
USPC .................................. 725/56, 116, 118, 133
See application file for complete search history.

(56) References Cited

U.S. PATENT DOCUMENTS

| | | |
|---|---|---|
| 2007/0040937 A1 | 2/2007 | Eum |
| 2007/0042757 A1 | 2/2007 | Jung et al. |
| 2007/0067797 A1 | 3/2007 | Lee et al. |
| 2007/0086481 A1 | 4/2007 | Klemets |
| 2007/0203999 A1 | 8/2007 | Townsley et al. |
| 2007/0223527 A1 | 9/2007 | Shao et al. |
| 2007/0244982 A1 | 10/2007 | Scott, III et al. |
| 2008/0031151 A1 | 2/2008 | Williams |
| 2008/0134262 A1 | 6/2008 | Jung et al. |
| 2008/0172482 A1 | 7/2008 | Shah |
| 2008/0232294 A1 | 9/2008 | Ulupinar et al. |
| 2008/0304408 A1 | 12/2008 | Kraemer et al. |
| 2009/0017482 A1 | 1/2009 | Riss et al. |
| 2009/0022065 A1 | 1/2009 | Chen et al. |
| 2009/0060030 A1 | 3/2009 | Song et al. |
| 2009/0087164 A1 | 4/2009 | Chikahisa et al. |
| 2009/0103651 A1 | 4/2009 | Lahtonen et al. |
| 2009/0132721 A1 | 5/2009 | Soroushian et al. |
| 2009/0178094 A1 | 7/2009 | Thomas et al. |
| 2009/0193469 A1 | 7/2009 | Igarashi |
| 2009/0265736 A1 | 10/2009 | Son |
| 2010/0162411 A1 | 6/2010 | Chang et al. |
| 2011/0145387 A1 | 6/2011 | Peng et al. |
| 2011/0158607 A1 | 6/2011 | Tariolle et al. |
| 2011/0161409 A1 | 6/2011 | Nair et al. |
| 2011/0219138 A1 | 9/2011 | Cho et al. |
| 2011/0225417 A1 | 9/2011 | Maharajh et al. |
| 2012/0331513 A1 | 12/2012 | Yamagishi et al. |
| 2013/0263203 A1 | 10/2013 | McGinn et al. |

FOREIGN PATENT DOCUMENTS

| | | |
|---|---|---|
| CN | 101243702 A | 8/2008 |
| CN | 101346935 A | 1/2009 |
| CN | 101567739 A | 10/2009 |
| CN | 101636989 A | 1/2010 |
| CN | 101641900 A | 2/2010 |
| CN | 101656615 A | 2/2010 |
| CN | 101931876 A | 12/2010 |
| CN | 102123304 A | 7/2011 |
| EP | 1 416 687 B1 | 8/2006 |
| EP | 1 729 516 A2 | 12/2006 |
| JP | 2007-507155 A | 3/2007 |
| JP | 2009-182751 A | 8/2009 |
| JP | 2011-101156 A | 5/2011 |
| JP | 2011-523305 A | 8/2011 |
| JP | 2011-193058 A | 9/2011 |
| KR | 10-2010-0066334 A | 6/2010 |
| WO | 2000/44145 A1 | 7/2000 |
| WO | 2010/106080 A1 | 9/2010 |

OTHER PUBLICATIONS

Song et al., Response to Call for Proposals for MPEG Media Transport, MPEG Meeting, ISO/IEC JTC1/SC29/WG11, Jan. 2011, Daegu, Samsung Electronics Co., Ltd., South Korea.
Youngkwon LIM, Review of w11792, AHG on MMT, ISO/IEC JTC1/SC29/WG11, Mar. 20, 2011, Geneva, Switzerland.
Decision on Grant dated Oct. 2, 2018, issued in the Japanese Patent Application No. 2017-235098.
Decision on Grant dated Oct. 2, 2018, issued in the Japanese Patent Application No. 2017-235097.
GSSTP: A signalling 1,5 transport protocol for DVB-S2 GSE-only transmission systems, XP 031764118, Sep. 13, 2010.
Extended European Search Report dated Aug. 29, 2019, issued in European Application No. 19175764.0.
Chinese Office Action dated Jul. 30, 2019, issued in Chinese Application No. 201710889916.0.
Chinese Office Action dated Jan. 3, 2020, issued in Chinese Patent Application No. 201710950762.1.
Chinese Office Action dated Feb. 27, 2020, issued in Chinese Patent Application No. 201710889916.0.

* cited by examiner

APPARATUS AND METHOD FOR CONFIGURING CONTROL MESSAGE IN BROADCASTING SYSTEM

CROSS-REFERENCE TO RELATED APPLICATION(S)

This application is a continuation application of prior application Ser. No. 14/351,419, filed on Apr. 11, 2014, which application is a U.S. National Stage application under 35 U.S.C. § 371 of an International application number PCT/KR2012/008404, filed on Oct. 15, 2012, which is based on and claim priority under 35 U.S.C § 119(a) of a Korean patent application number 10-2011-0104892, filed on Oct. 13, 2011, in the Korean Intellectual Property Office, the disclosure of which is incorporated by reference herein in its entirety.

TECHNICAL FIELD

The present invention relates to an apparatus and method of configuring a control message in a broadcast system, and more particularly, to an apparatus and a method of configuring a control message in a broadcast system that supports a multimedia service based on an Internet protocol.

BACKGROUND ART

A conventional broadcast network generally uses the Moving Picture Experts Group-2 Transport Stream (MPEG-2 TS) for delivering multimedia contents. The MPEG-2 TS is used as a representative transmission technique for delivering a bit stream in which a plurality of broadcast programs (a plurality of encoded video bit streams) is diversified in a transmission environment having an error. For example, the MPEG-2 TS is appropriate for digital TV broadcasts, and the like in the multimedia era.

FIG. 1 illustrates a layer structure for supporting the conventional MPEG-2 TS.

Referring to FIG. 1, the layer for supporting the MPEG-2 TS includes a media coding layer 110, a sync layer 120, a delivery layer 130, a network layer 140, a data link layer 150, and a physical layer 160.

The media coding layer 110 and the sync layer 120 are formed in a format which is easily usable as a basal unit of recording or transmitting media data. Further, the delivery layer 130, the network layer 140, the data link layer 150, and the physical layer 160 record a data block (for example, "AU") configured by the sync layer 120 in a recording medium or configure a multimedia frame for transmission. The configured multimedia frame is delivered to a subscriber's terminal and the like through a predetermined network.

To this end, the sync layer 120 is formed of a fragment block 122 and an access unit 124, and the delivery layer 130 is formed of an MPEG-2 TS/MP4 132, an RTP/HTTP 134, and a UDP/TCP 136.

However, the MPEG-2 TS has several limits in supporting a multimedia service. The limits of the MPEG-2 TS may include inefficient transmission due to a unidirectional communication and fixed frame size, and unnecessarily generated overhead during transmission using a transmission protocol and Internet Protocol (IP) specified for audio/video data.

Accordingly, the MPEG Media Transport (MMT) standard has been suggested by MPEG as a new multimedia transmission technique for supporting multimedia services based on the MPEG technique. Especially, the MMT standard is suggested by MPEG in order to overcome the limits of the MPEG-2 TS.

For example, the MMT standard may be applied for effective transmission of a hybrid content through a heterogeneous network. Here, the hybrid content refers to a set of contents having multimedia components associated with a video/audio/application, and the like. The heterogeneous network refers to a hybrid network in which a broadcasting network, a communication network, and the like exist together.

In addition, the MMT standard aims to define an IP-friendly transport technology that is a basic technology in a transport network for a multimedia service.

Accordingly, the MMT standard, which representatively provides an efficient MPEG transport technology in a multimedia service environment that varies based on an IP, has been continuously researched and standardized.

Particularly, the MMT standard needs a scheme for providing an efficient MPEG transport technology in the recent multimedia service environment that desires to provide a hybrid network and hybrid content.

DETAILED DESCRIPTION OF THE INVENTION

Technical Problem

An aspect of the present invention is to provide an apparatus and a method of providing control information associated with various types of multimedia contents in a broadcasting system that supports a multimedia service based on an Internet protocol.

Another aspect of the present invention is to provide an apparatus and a method of providing control information for consuming a hybrid multimedia content in a broadcasting system that supports a multimedia service based on an Internet protocol.

Another aspect of the present invention is to provide an apparatus and a method of providing information associated with a hybrid multimedia content by taking into consideration features of a heterogeneous network in a broadcasting system that supports a multimedia service based on an Internet protocol.

Technical Solution

In accordance with an aspect of the present invention, there is provided an apparatus for providing a hybrid content, the apparatus including: a control message configuration unit to generate a signaling message for consuming the hybrid content; a transmission unit to transmit the signaling message generated by the control message configuration unit to a hybrid content consuming device; and a control unit to control the control message configuration unit and the transmission unit so as to generate the signaling message and to transmit the generated signaling message, wherein the control message configuration unit generates the signaling message using a payload formed of at least one of a plurality of tables defining information required for consumption of the hybrid content, and a header including an optional field that records information associated with the at least one table forming the payload, based on a type of a signaling message designated by the control unit for the consumption of the hybrid content, and one of the plurality of tables is a Device Capability Information Table (DCIT) that defines information associated with a recommended device capability for consuming a package/asset of the hybrid content.

In accordance with another aspect of the present invention, there is provided an apparatus for consuming a hybrid content, the apparatus including: a reception unit to receive a signaling message from an apparatus for providing a hybrid content; a control message interpreting unit to obtain information required for consuming the hybrid content from the signaling message received through the reception unit; and a control unit to control the reception unit and the control message interpreting unit so as to receive the signaling message and to obtain the information required for consuming the hybrid content from the received signaling message, wherein the control message interpreting unit determines a type of received signaling message based on header information of the received signaling message, and obtains information required for consuming the hybrid content defined by at least one table forming a payload of the received signaling message based on the determined type of the signaling message and information associated with the at least one table recorded in an optional field forming the header information, and one of the plurality of tables, which is capable of being selected to be the at least one table forming the payload of the signaling message, is a Device Capability Information Table (DCIT) defining information associated with a recommended device capability for consuming a package/asset of the hybrid content.

In accordance with another aspect of the present invention, there is provided a method of providing a hybrid content in a content providing apparatus, the method including: generating a signaling message for consuming the hybrid content; and transmitting the generated signaling message to a hybrid content consuming apparatus, wherein generating comprises generating the signaling message using a payload formed of at least one of a plurality of tables defining information required for consuming the hybrid content and a header including an optional field that records information associated with the at least one table forming the payload, based on a type of a signaling message designated for the consumption of the hybrid content, and one of the plurality of tables is a Device Capability information Table (DCIT) defining information associated with a recommended device capability for consuming a package/asset of the hybrid content.

In accordance with another aspect of the present invention, there is provided a method of consuming a hybrid content in a hybrid content consuming apparatus, the method including: receiving a signaling message from an apparatus for providing a hybrid content; and obtaining information required for consuming the hybrid content from the received signaling message, wherein obtaining comprises: determining a type of received signaling message based on header information of the received signaling message; and obtaining the information required for consuming the hybrid content defined by at least one table forming a payload of the received signaling message based on the determined type of the signaling message and information associated with the at least one table recorded in an optional field forming the header information, and one of the plurality of tables, which is capable of being selected to be the at least one table forming the payload of the signaling message, is a Device Capability Information Table (DCIT) defining information associated with a recommended device capability for consuming a package/asset of the hybrid content.

Advantageous Effects

According to embodiments of the present invention, a control message may be configured and provided for consuming a hybrid service or a hybrid content and thus, effective MPEG transmission may be supported in a multimedia environment.

According to embodiments of the present invention, a hybrid service or a hybrid content may be provided through a heterogeneous network using control information and thus, effective MPEG transmission may be supported in a multimedia environment.

Meanwhile, other various effects will be explicitly or implicitly disclosed in the detailed descriptions in association with the embodiments of the present invention to be set forth in the following descriptions.

MODE FOR CARRYING OUT THE INVENTION

Figure 1:
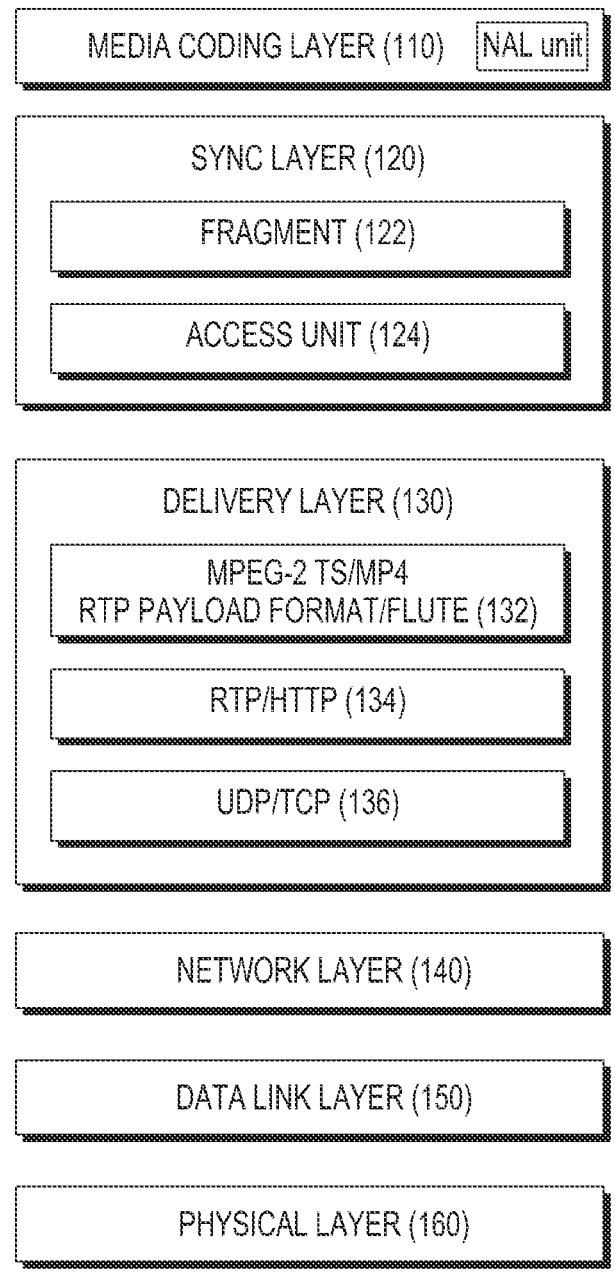
FIG. 1 illustrates a layer structure for supporting the conventional MPEG-2 TS.

Hereinafter, an exemplary embodiment according to the present invention will be described in detail with reference to the accompanying drawings. It should be noted that the same elements will be designated by the same reference numeral in any drawing.

Also, although the specific matters have been described herein, these are provided merely to help with a thorough understanding of the present invention. However, it is obvious to a person ordinarily skilled in the art that the present invention may be implemented without the specific matters.

In the following description of the present disclosure, a detailed description of known functions or configurations incorporated herein will be omitted when it may make the subject matter of the present disclosure rather unclear.

In an embodiment of the present invention to be described below, the MMT standard will be described as an example, but the present invention is not limited thereto, and may be applied to other broadcasting techniques.

Also, hereinafter, an embodiment of the present invention will describe a layer structure defined in the MMT standard. Also, an embodiment of the present invention proposes a configuration of a control information message for consuming a multimedia content and thus, a layer for providing the control information message in the layer structure defined in the MMT standard will be described in detail.

Figure 2:
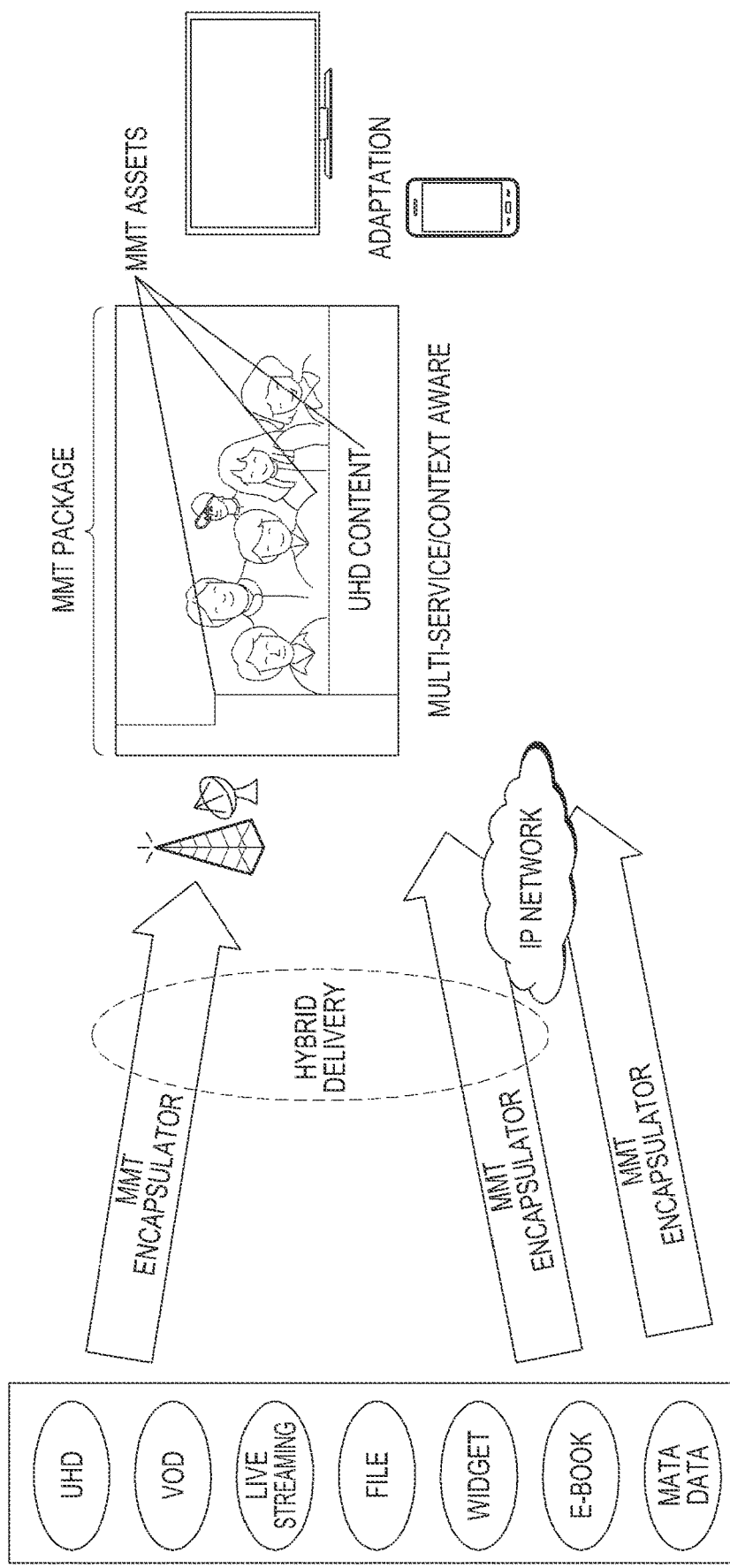
FIG. 2 is a diagram conceptually illustrating an MMT service provided by a broadcasting system based on the MMT standard according to an embodiment of the present invention.

FIG. 2 conceptually illustrates an MMT service provided by a broadcasting system (hereinafter, referred to as an 'MMT system') that is based on the MMT standard according to an embodiment of the present invention.

FIG. 2 assumes that a content for the MMT service includes UHD, VOD, live streaming, a file, a widget, an E-book, metadata, and the like. However, the MMT service may target all of the contents expressible with an electrical signal as a matter of course.

Multimedia data associated with each of the various contents is encapsulated in a predetermined format by an MMT, and forms a multimedia frame to be delivered in a hybrid manner (hybrid delivery) to a subscriber's terminal through a heterogeneous network. Here, the heterogeneous network refers to a network of a transmission environment in which a broadcasting network, an IP network, and the like exist together.

A subscriber terminal that is provided with the multimedia frame that is transmitted in a hybrid manner through the heterogeneous network extracts multimedia data corresponding to a desired content from the multimedia frame. Video/audio/application and the like corresponding to the desired content may be provided to a user, based on the extracted multimedia data. In this example, each piece of multimedia data corresponding to the video/audio/application and the like provided for a predetermined content may be referred to as an 'MMT asset'. Further, the meaning of the subscriber terminal as used here includes most terminals that are capable of supporting a multimedia service. A representative example of the subscriber terminal may include an IP TV, a smart phone, and the like.

Accordingly, an objective achieved by the MMT service may be high quality content delivery, hybrid content support, hybrid network support, and the like.

Figure 3:
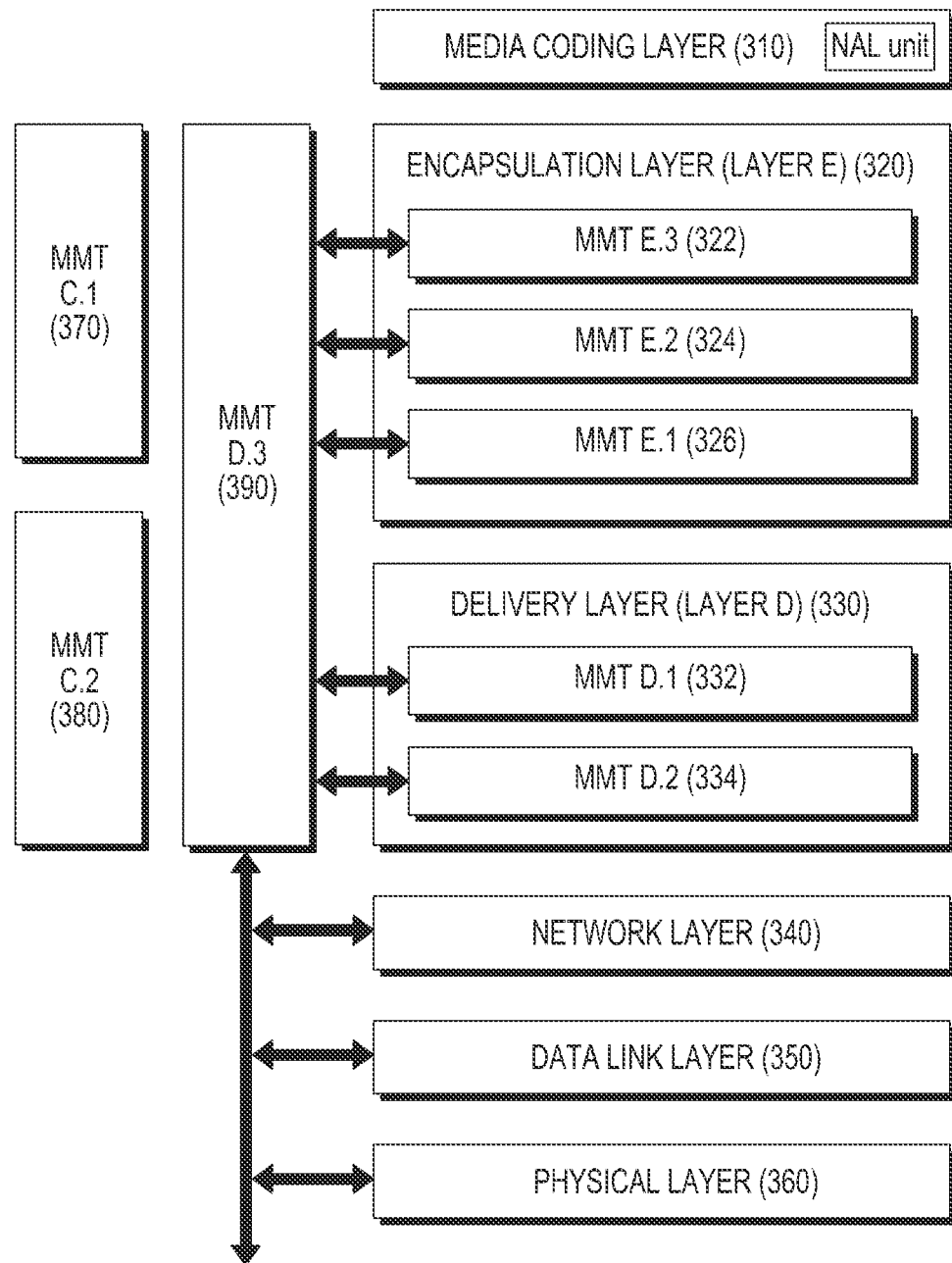
FIG. 3 is a diagram illustrating a layer structure for transmitting a multimedia frame associated with a multi-service/content through a heterogeneous network in an MMT system according to an embodiment of the present invention.

FIG. 3 illustrates a layer structure for transmitting a multimedia frame associated with a multi-service/content through a heterogeneous network in an MMT system according to an embodiment of the present invention.

Referring to FIG. 3, the MMT system configures and transmits a multimedia frame. The MMT system includes a media coding layer 310, an encapsulation layer (Layer E) 320, a delivery layer (Layer D) 330 and 390, a network layer 340, a data link layer 350, a physical layer 360, and a control layer (Layer C) 370 and 380.

The media coding layer 310 and the Layer E 320 generate multimedia data associated with a multi-content or a multi-service. Therefore, the two layers may be regarded as a configuration of a 'multimedia data generating unit'.

The Layer D 330 configures a multimedia frame. Therefore, the Layer D 330 may be regarded as a configuration of a 'multimedia frame configuration unit'. The Layer D 330 combines header information and multimedia data so as to configure a multimedia frame. The header information may be formed of a frame identifier for distinguishing a multimedia frame, and information required for measuring a quality of the connection service in a network layer and an end-to-end network performance.

The Layer C 370 and 380 provides information associated with generation, consumption, and transmission of a hybrid content. Therefore, the Layer C 370 and 380 may be regarded as a configuration of a 'multimedia control unit'.

As described above, the MMT system includes three technique areas, that is, the Layer E 320, the Layer D 330 and 390, and the Layer C 370 and 380. The Layer E 320 is in charge of generating a hybrid content, the Layer D 330 and 390 is in charge of effective transmission of a hybrid content through a heterogeneous network, and the Layer C 370 and 380 is in charge of general control for managing consumption and transmission of a hybrid content.

The Layer E 320 includes MMT E.3 322, MMT E.2 324, and MMT E.1 326. MMT E.3 322 generates a fragment which is the basal unit for the MMT service, with the coded multimedia data provided from the media coding layer 310 as an input. MMT E.2 324 generates an Access Unit (AU) for the MMT service, using a fragment generated by the MMT E.3 322. The MMT E.1 326 generates a format for generating, storing, and delivering the hybrid content by combining or dividing the AUs provided by the MMT E.2 324.

The Layer D is formed of MMT D.1 332, MMT D.2 334, and MMT D.3 390. MMT D.1 332 is in charge of Application Protocol (AP) that plays a role similar to an RTP or HTTP. The MMT D.2 334 is in charge of a network layer protocol that plays a role similar to a UDP or a TCP. The MMT D.3 390 executes an operation for optimization between each layer forming the Layer E 320 and each layer forming the Layer D 330.

The Layer C is formed of MMT C.1 370 and MMT C.2 380. The MMT C.1 370 provides information related to the generation and the consumption of a hybrid content, and the MMT C.2 380 provides information related to the transmission of a hybrid content.

Figure 4:
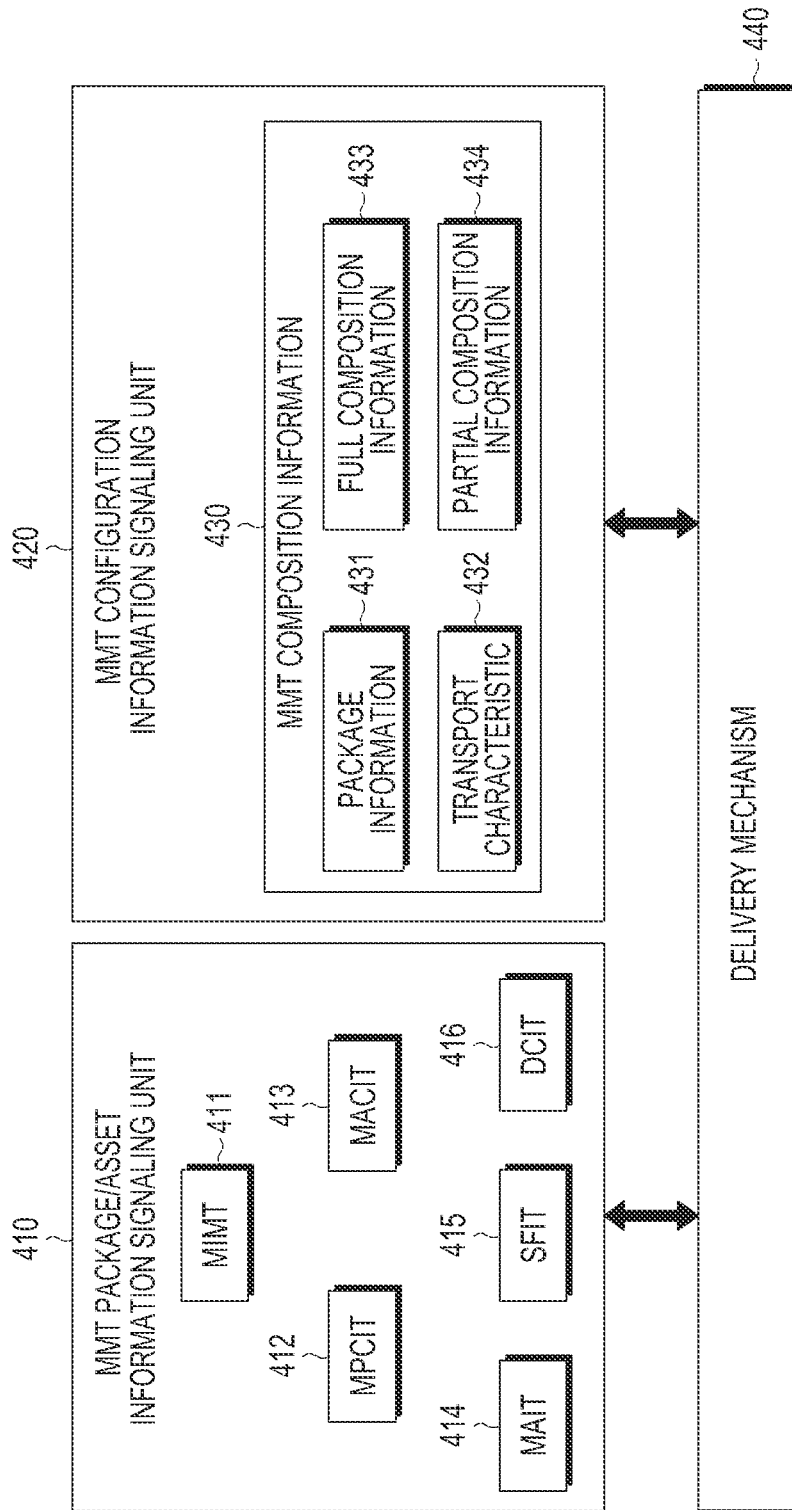
FIG. 4 is a diagram illustrating a structure of an MMT C.1 according to an embodiment of the present invention.

FIG. 4 illustrates a structure of the MMT C.1 370 according to an embodiment of the present invention.

The MMT C.1 provides information associated with a hybrid multimedia content and information used when the hybrid multimedia content is consumed. In the MMT standard, the hybrid multimedia content is configured in a form of an MMT asset or an MMT package. The MMT package may include a plurality of MMT assets.

Referring to FIG. 4, the MMT C.1 includes an MMT package/asset information signaling unit 410 and an MMT configuration information signaling unit 420. The MMT package/asset information signaling unit 410 includes an MMT Package/Asset Information Management Table (MIMT) 411, an MMT Package Configuration Information Table (MPCIT) 412, an MMT Asset Configuration Information Table (MACIT) 413, an MMT Access Information Table (MAIT) 414, a Specific Function Information Table (SFIT) 415, and a Device Capability Information Table (DCIT) 416.

The MPCIT 412 includes information associated with an MMT asset such as a name of a content, a provider of a content, a content format, an application required for consuming a content, specifications of hardware, or the like. The MACIT 413 includes information associated with an MMT package, such as package information, a package provider, and asset information associated with assets forming a package. The MAIT 414 includes information allowing access to an MMT asset or an MMT package. The SFIT 415 includes system specific information such as device management or digital rights management. The DCIT 416 includes function information of a device recommended or demanded for the consumption of an MMT asset or an MMT package. The MIMT 411 includes table management information, such as version information, an update period, and the like for the five tables.

The MMT configuration information signaling unit 420 is in charge of transmitting MMT configuration information. The MMT configuration information includes package information 431 associated with an MMT package, transport characteristics 432 corresponding to information that needs to be taken into consideration when the MMT package is transmitted, and a package required when an MMT package or an asset of the MMT package is displayed on a screen of an apparatus or composition information required when an asset of a package is provided on the screen of the apparatus.

The transport characteristics 432 may include information associated with a transport rate and an error rate, or a quality of experience.

The composition information includes full composition information 433 providing, all at once, all of the composition information within a consumption time when an MMT package or an MMT asset is consumed, and partial composition information 434 delivered with several pieces for various compositions within the consumption time. The partial composition information 434 may include various commands, such as play, stop, rewind, show up, and the like.

Control information provided from the MMT package/asset information signaling unit 410 and the MMT configuration information signaling unit 420 may be transmitted through various delivery mechanisms 440.

FIGS. 5A, 5B, 5C, 5D and 5E illustrate a method of transmitting an MMT C.1 message (hereinafter, referred to as a 'Layer C1 message') according to various embodiments of the present invention.

Figure 5A:
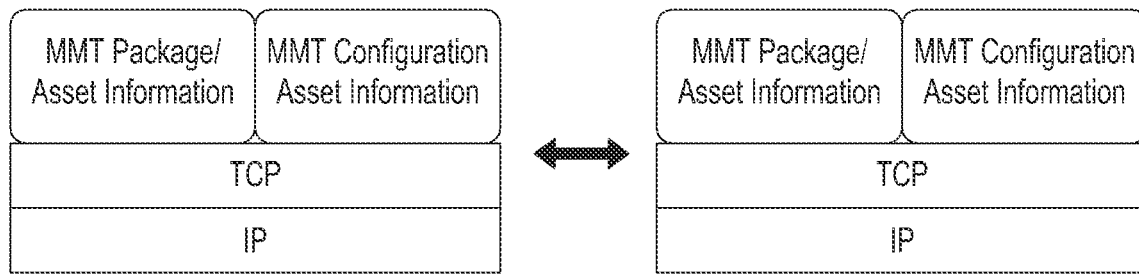
FIGS. 5A, 5B, 5C, 5D and 5E are a diagram illustrating a method of transmitting an MMT C.1 message according to various embodiments of the present invention.

FIG. 5A shows an example of transmitting the Layer C1 message formed of the MMT package/asset information and MMT configuration information to a partner based on a TCP/IP. The scheme of transmitting the Layer C1 message based on the TCP/IP does not need a separate protocol, and is appropriate for when a server that provides an MMT asset/package and a client are directly connected through the Internet.

Figure 5B:
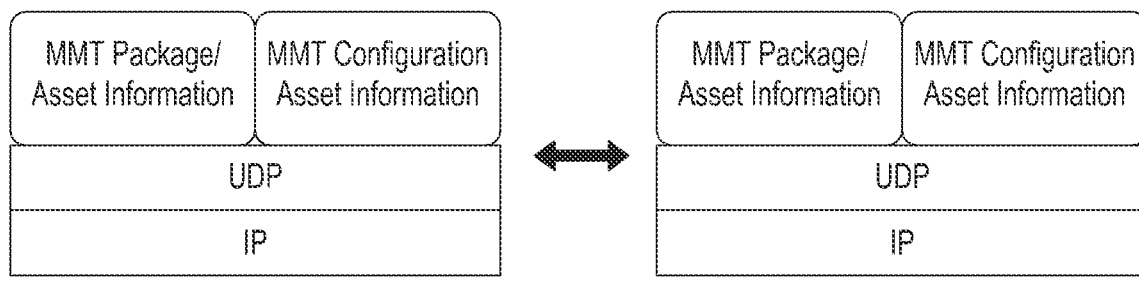

FIG. 5B shows an example of transmitting the Layer C1 message in an UDP/IP environment. This is reliable and has no error, but this is appropriate for an environment where difficulty in using TCPs that generates a great amount of overhead exists or for a unidirectional transmission based on an IP.

Figure 5C:
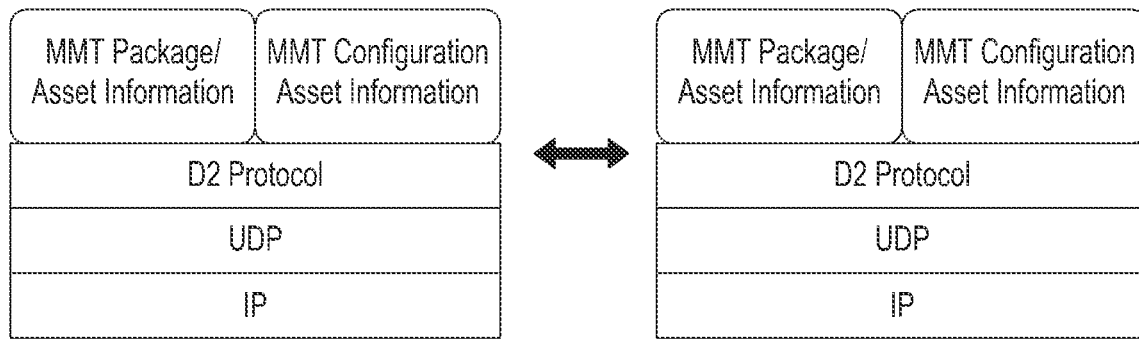

FIG. 5C shows an example of transmitting the Layer C1 message based on a D2 protocol which is provided as a transmission protocol of an MMT system. A Layer D is a layer that is in charge of transmission, and is formed of a D1 payload layer and D2 protocol layer. The D1 payload layer is a layer to configure a payload to enable transmission of an MMT package/asset, the Layer C1 message or the like, irrespective of various transmission protocols. The D2 protocol layer is a layer that provides a protocol by taking into consideration an IP environment or a transmission environment, so as to transmit a D1 payload. FIG. 5C is associated with transmission of the Layer C1 message by including the message in a payload of a packet provided in the D2 protocol layer, and is appropriate when the Layer C1 message needs to be transmitted through an identical logical channel to a logical channel through which a multimedia content is transmitted.

Figure 5D:
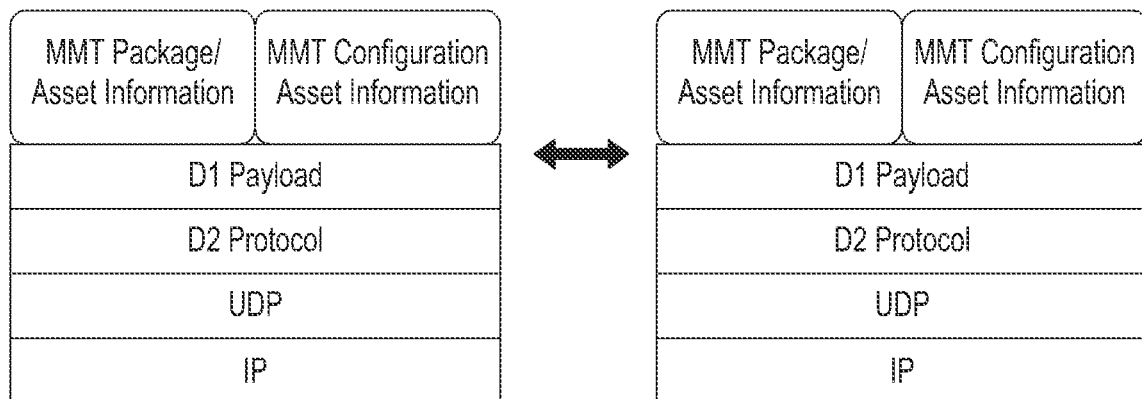

FIG. 5D shows an example of transmitting the Layer C1 message by including the message in a D1 payload. This is appropriate when the Layer C1 message needs to be immediately consumed, for example, when partial composition information associated with an MMT package/asset is transmitted.

Figure 5E:
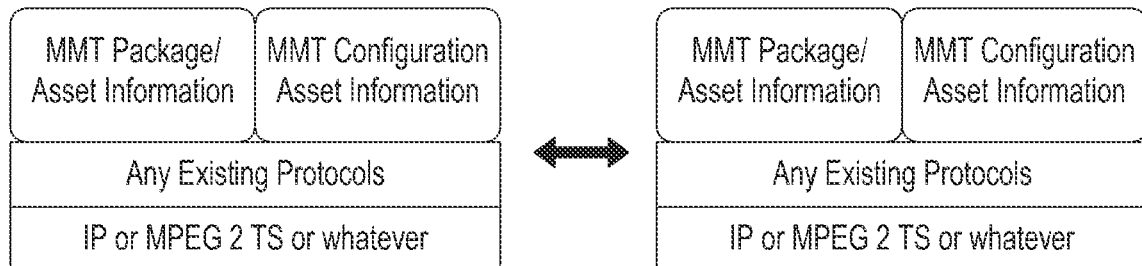

FIG. 5E shows an example of transmitting the Layer C1 message, irrespective of an IP environment or a broadcasting environment such as MPEG-2 TS. That is, it shows that the Layer C1 message may be included in a protocol such as an SDP, for transmission.

FIGS. 6A, 6B, 6C, 6D, and 6E illustrate a configuration of a Layer C1 message according to various embodiments of the present invention.

Figure 6A:
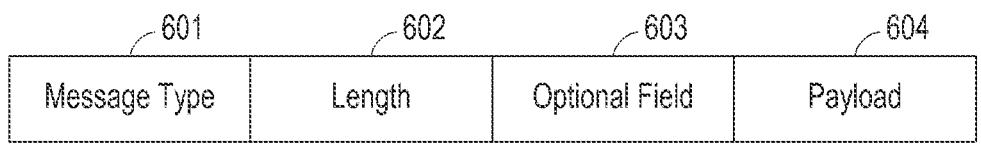
FIGS. 6A, 6B, 6C, 6D, and 6E are a diagram illustrating a configuration of a Layer C1 message according to various embodiments of the present invention.

FIG. 6A shows a general structure of the Layer C1 message.

The Layer C1 message is formed of a message type field 601, a length field 602, an optional field 603, and a payload field 604.

The message type field 601 is a field for indicating a content carried by the Layer C1 message from among an MMT package/asset information, MMT configuration information, full composition information, and a partial composition information.

For the length of the message type field 601, 2 bits may be sufficient. However, by taking into consideration the addition of the Layer C1 message, the length may be 1 byte. Therefore, the length of the message type may not be limited to a predetermined value.

The length field 602 is a field indicating an entire length of the Layer C1 message. The entire length of the Layer C1 message may have a variable length depending on a length of a header and a payload of the Layer C1 message. For example, a short Layer C1 message may set the length of the length field 602 to be short, and a long Layer C1 message may set the length of the length field 602 to be long.

The optional field 603 is not a field that is selectively provided in the Layer C1 message, but is a field that provides a different value that the Layer C1 message may have. This will be described in detail with reference to FIGS. 6B to 6E.

Figure 6B:
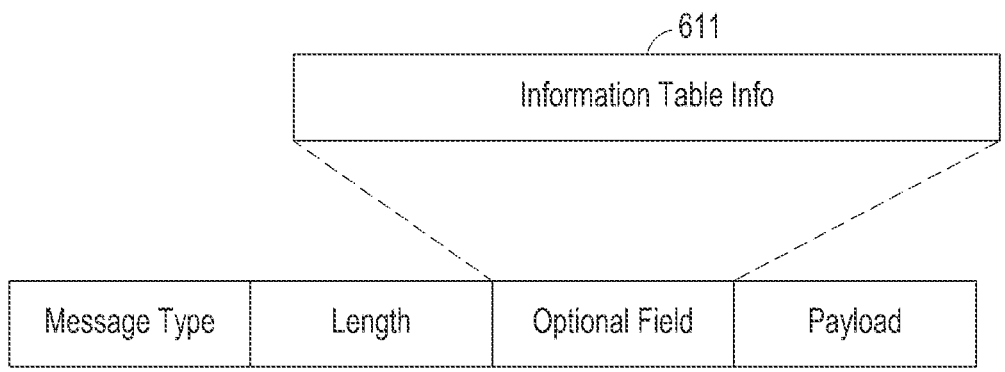

The payload field 604 is a field for delivering actual content of the Layer C1 message. FIG. 6B shows an example of the Layer C1 message of which a message type is MMT package/asset information.

In this example, in the optional field 603 of the Layer C1 message, table information (Information Table Info) 611 may be recorded. The table information 611 is information indicating a type of a table that is included in a payload for transmission.

For example, when the table information 611 is 6 bits and the value is 111000, the payload of the Layer C1 message includes MIMT, MPCIT, MACIT, and the like, but does not include MAIT, SFIT, DCIT, and the like.

Therefore, a receiver determines whether a required table is included in a payload based on the table information 611 recorded in the optional field 603. This may save the receiver from carrying out unnecessary operations.

In the above description, whether the table corresponding to the MMT package/asset information exists has been determined based on the table information 611 expressed in a binary manner and recorded in the optional field 603. However, the table information 611 recorded in the optional field 603 may further indicate a table identifier, version information, and the like. When the table information 611 includes additional information, the length of the optional field 603 may be extended.

FIG. 6 C shows an example of the Layer C1 message of which a message type is MMT configuration information.

In this example, in the optional field 603 of the Layer C1 message, a package/asset ID 621 and configuration information (configuration info) 622 are included. The configuration information 622 includes version information.

The MMT configuration information is information connected to a predetermined MMT package/asset and thus, a package/asset ID 621 is certainly required. Also, the MMT configuration information includes configuration information 622 transmitted through a payload, that is, a version and the like.

However, when the Layer C1 message is transmitted together with an MMT package or an asset corresponding to the MMT configuration information, the MMT configuration information may not include the package/asset ID.

Figure 6C:
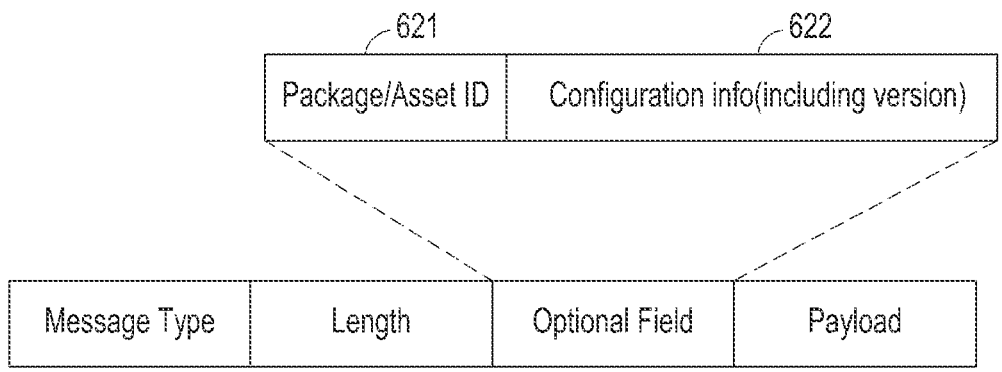
Figure 6D:
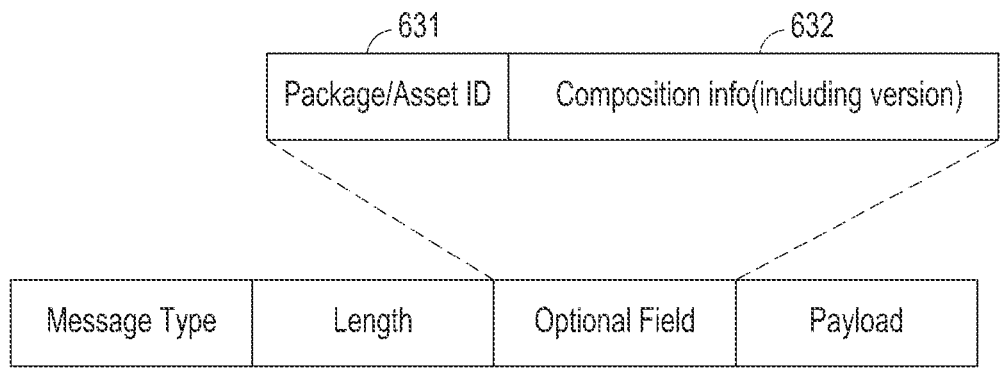

FIG. 6D shows an example of the Layer C1 message of which a message type is full composition information of an MMT package/asset.

In this case, a package/asset ID 631 and composition information (composition info) 632 are recorded in the optional field 603 of the Layer C1 message. The composition information 632 includes version information.

The full composition information is information connected to a predetermined MMT package/asset and thus, the package/asset ID 631 is certainly required. The full composition information includes composition information 632 transmitted through a payload, that is, version information or the like.

However, when the Layer C1 message is transmitted together with an MMT package/asset corresponding to the full composition information, the full composition information may not include the package/asset ID.

Figure 6E:
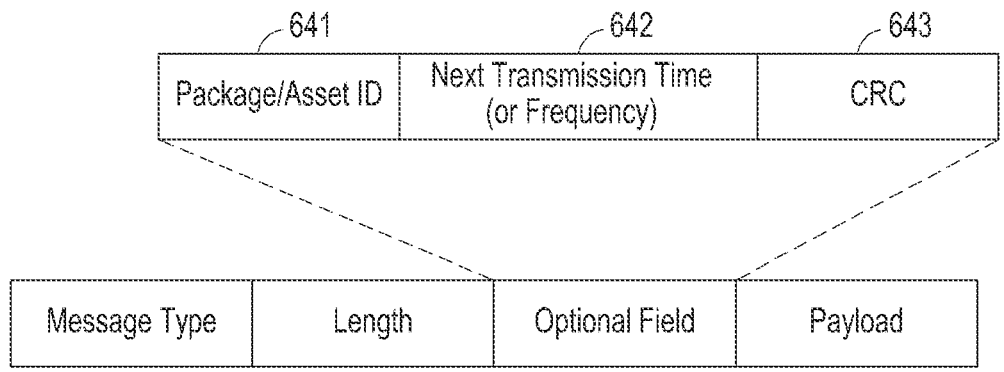

FIG. 6E shows an example of the Layer C1 message of which a message type is partial composition information of an MMT package/asset.

In this example, in the optional field 603 of the Layer C1 message, a package/asset ID 641, a next transmission time 642, and a CRC 643 are included.

The partial composition information is information connected to a predetermined MMT package/asset and thus, a package/asset ID 641 may be required. However, due to the feature of the partial composition information, the Layer C1 message may be transmitted together with the MMT package/asset. In this case, the package/asset ID 641 may be omitted.

The next transmission time 642 is information indicating, in advance, a point in time of receiving partial composition information subsequent to the currently received partial composition information. The next transmission time 642 is provided in advance and thus, the receiver may prepare to take an appropriate action.

As the next transmission time 642, a transmission period of the partial composition information may be provided, as opposed to a predetermined time. Also, due to the feature of the partial composition information, a command may be transmitted. In this case, the CRC 643 may be included in the optional field to check a validity of the transmitted command.

The payload of the partial composition information may include various types of pieces of information. For example, it may be formed of respective scene commands such as a Light application Scene Representation (MPEG LaSER) which is a scene composition technique, BInary Format for Scenes (3GPP BIFS), and the like. Also, a command such as play, stop, replace, show up, appear, disappear, or the like, may be directly defined for use, and a relatively short length of a scene composition or the like in an XML format or an SMIL format may be included in the payload of the partial composition information.

The content of the payload of the full composition information may be expressed in SMIL, XML, HTML, and the like. The payload of the full composition information may include information used for configuring a content during a consumption time of an MMT package/asset.

The MMT configuration information includes a content defined by a Layer E that packages up a hybrid multimedia content in an MMT system.

Hereinafter, a detailed configuration of a table related to the MMT table/asset information will be described.

Table 1 shows an example of an MIMT.

TABLE 1

| Name | Description | Data Type |
|---|---|---|
| MIMT | MMT Package/Asset Information Management Table | |
| id | Unique identifier MIMT | |
| version | Version of MIMT<br>The newer version overrides the older one as soon as it has been received. | |
| MIMT Transmission info | MIMT transmission information having StartTime or Retransmission Period | |
| StartTime | Starting Time of MIMT Transmission | |
| Retransmission Period | Retransmission time of MIMT Transmission | |
| Event Reception | Information for Event Reception<br>In case of delivery over Broadcast channel, IPBroadcastDelivery specifies the address information for receiving Event.<br>In case of delivery over Interaction channel, PollURL specify address information for polling event and 'PollPeriod' specifies the associated polling period.<br>Contains the following elements:<br>IPBroadcastDelivery<br>PollURL<br>PollPeriod | |
| IPBroadcastDelivery | Provides IP multicast address and port number for reception of Event over the broadcast channel.<br>Contains the following attributes:<br>port<br>address | |

TABLE 1-continued

| Name | Description | Data Type |
|---|---|---|
| port | Event delivery UDP destination port number; delivery over Broadcast Channel | |
| address | Event delivery IP multicast address; delivery over Broadcast Channel | |
| PollURL | URL through which a client can poll Event over Interaction Channel. | |
| PollPeriod | While polling the events, the NTC is expected to poll every "PollPeriod" seconds. | |
| Information Table Info | Information table info has the version information of each Information table along with MIMT. It have Information Table ID, version, transmission time, repetition period, Location and 2$^{nd}$ location | 1 to N |
| Information table ID | Information table Identification | |
| Version | Version of Information Table | |
| Transmission Time | Transmission Time of IT | |
| Repetition Period | Repetition Period of IT | |
| Location | Address where a client gets IT | |
| 2nd location | Alternative Address where a client gets IT | |
| TableFiltercode | Specifies the criteria for grouping Tables If several criteria for grouping are present at the same time, all those grouping criteria apply to the set of Information tables. GenreGroupingCriteria Contains the following criteria: Package ID, Asset ID Genre Locations Time Terminal Capability And so on Note: the above list is not limited. | |
| PrivateExt | An element serving as a container for proprietary or application-specific extensions | |
| <proprietary elements> | Proprietary or application-specific elements that are not defined here | |

The MIMT shown in Table 1 provides information associated with information tables required for consuming an MMT package/asset.

An amount of information required for consuming one or a few MMT packages is insignificant. However, when a plurality of MMT packages are provided through a broadcasting network, a number of information tables that provide information required for consuming the MMT packages may increase.

The MMT package is an object for transmitting and storing a hybrid multimedia content formed of various types of data pieces. For example, it may be a music chart content including an application program for a poll.

An MMT asset is a logical or physical object indicating a program or the like that forms the MMT package. For example, in a music chart content package, a broadcasting image, a broadcasting audio, an application program for a poll, and the like may be MMT assets.

The ID in Table 1, which is an identifier of the MIMT, may be a globally unique identifier, may be unique only within a range of a provider providing the MIMT, and may be unique only within a transmission network. As described above, a range of the validity of the MINT may be determined according to the purpose of use of the MIMT The MIMT Transmission Info provides information required for transmitting the MIMT, and includes two sub-elements, that is, StartTime and Retransmission Period. StartTime provides an initial transmission time of the MIMT. Retransmission Period indicates a period in which the MIMT is transmitted after the initial transmission time indicated by StartTime. That is, Retransmission Period provides information indicating when a user terminal is to receive the MIMT.

Event Reception provides information through which an event in which a business operator providing the MIMT or a service provider may inform the user terminal of specific or predetermined information is received. The event may be sent through a unidirectional channel such as a terrestrial broadcasting channel and a bidirectional, channel such as the Internet. Accordingly, information through which the event is received through the unidirectional channel and the bidirectional channel may be provided. The Event Reception may include IPBroadcastDelivery, PollURL, PollPeriod, or the like as sub-elements.

IPBroadcastDelivery provides unidirectional channel-based event transmission information, and includes a port and an address as attributes.

The address provides IP address information from which an event is transmitted. The IP address may include a broadcast IP address, a multicast IP address, an IP address allocated by a service provider, and the like. The port provides port address information that identifies a data gram through which the event is transmitted, from an IP packet stream specified in the address. Based on the information provided from the port and the address, the user terminal may receive the event transmitted through the unidirectional channel.

PollURL and PollPeriod are information through which an event is received through the bidirectional channel.

PollURL provides address information from which the user terminal directly reads the event, such as a URL, and PollPeriod informs the user terminal of a point in time of receiving a next event, as a point in time of updating the event.

Information Table Info provides an identifier, a version, a transmission time, a repetition period, reception information, and second reception information for other information tables connected with the MIMT to provide information associated with an MMT package/asset. The user terminal may receive other information tables that provide information required for consuming an MMT package/asset, using the Information Table Info.

The Information Table Info includes information associated with information tables, from a single information table through a plurality of different information tables. The information associated with the information table includes an identifier of an IT, provided in InformationTableID, version information of an information table, provided in version, a point in time of transmission of an information table, provided in Transmission Time, a repeat transmission period of an information table, provided in Repetition Period, an address at which an information table is received, provided in Location, and another address at which an information table is received, provided in 2nd Location. The address may have different values according to an environment in which the information tables are delivered.

For example, when the information tables are transmitted through an MPEG-2 TS stream, the address may be a value provided for channel reception in an MPEG-2 TS system. When the information table is transmitted to an IP broadcasting network, the address may be an IP address and a port number. When the information tables are transmitted through a mobile communication network, the address may be information required for channel reception in a mobile communication network.

The $2^{nd}$ Location is provided to cope with the case in which the information table is not received through the information provided by Location. That is, when information is obtained before a repeat period of the information table or when direct access to a transmission network through which the information table is transmitted is difficult, the information table may be received through the information provided by $2^{nd}$ Location.

For example, Location provides information through which the information table is received through the broadcast channel, and $2^{nd}$ location provides an address of a server capable of providing the information table so that the information table may be received by an appropriate method when needed.

TableFilterCode provides predetermined criteria so as to selectively use information tables. Examples of the criteria include a package ID, an asset ID, a genre, a location of a user terminal, a time, a capability of a user terminal (terminal capability), or the like. TableFilterCode of the MIMT provides a predetermined MMT package ID. Therefore, the user terminal selects only information tables that selectively receive the predetermined MMT package ID, so as to use or provide the user of only information tables that satisfy the predetermined MMT package ID from among the received information tables.

PrivateExt is an element used when a business operator, an MMT package producing company, or a producer producing the MIMT desires to provide predetermined information.

Table 2 shows an example of MPCIT.

TABLE 2

| Name | Description | Data Type |
|---|---|---|
| MPCIT | MMT Package Configuration information | |
| id | ID of MPCIT | |
| version | Version of MPCIT The newer version overrides the older one as soon as it has been received. | |
| MPCIT Transmission info | MPCIT transmission information having StartTime or Retransmission Period | |
| StartTime | Starting Time of MPCIT Transmission | |
| Retransmission Period | Retransmission time of MPCIT | |
| MMT Package ID | The globally unique identifier identifying MMT Package | |
| Package Type | Allowed values are: 0—unspecified 1— Basic Video 2— Basic Audio 3—Rich Media 4—ebook 5—application 6—Hybrid Package 7—255 reserved for future use | |
| Name | Name of the Package | |
| Description | Description, possibly in multiple languages | |
| AudioLanguage | Audio language used in Package | |
| TextLanguage | Textual language used in Package | |
| ParentalRating | The ParentalRating of Package | |
| TargetUserProfile | Profile attributes of the users whom the Package is targeting at | |
| Required DEvice Capability | Required Device Capability for Package consumption | |
| List of Assets | List of Assets which belongs to a Package It has Asset ID and MACIT info. | |
| Asset ID | ASSET ID | |
| MACIT INFO | Information of MACIT ID and Address | |
| PrivateExt | An element serving as a container for proprietary or application-specific extensions | |
| <proprietary elements> | Proprietary or application-specificel ements that are not defined in here. | |

The MPCIP shown in Table 2 is a table that provides composition information associated with an MMT package. The information provided in the MPCIT is information associated with the MPCIT and composition information of an MMT package. The information associated with the MPCIT includes an MPCIT identifier (ID), a MPCIT version, and MPCIT transmission information (MPCIT Transmission Info).

The identifier (ID) of the MPCIT may be a globally unique, may be unique within a range of a provider that provides the MPCIT, or may be unique within a transmission network. An effective range of the MPCIT may be determined based on the purpose of use.

MPCIT Transmission Info provides information required for delivering the MPCIT, and has StartTime and Retransmission Period as sub elements.

StartTime provides an initial transmission time of MPCIT, and Retransmission Period indicates a period in which the MPCIT is transmitted after the initial transmission time indicated by StartTime. Therefore, it may enable a user terminal to determine when the user terminal is to receive the MPCIT.

The composition information associated with the MMT package includes an identifier, a type, a name, a description, voice information, and text information of the package, viewer protection, target user information, information associated with requirements of a terminal required for consuming the MMT package, and information associated with assets forming the MMT package.

The MMT Package ID is an identifier of the MMT package of which composition information is provided through the MPCIT. The MMT Package ID may be allocated by a producer of the MMT package, or may be allocated by a service provider that uses the MMT package. Also, the effective range of the MMT Package ID may be globally unique, may be locally unique, or may be unique for each provider. Although an identifier allocation system to achieve the above descriptions is not described in detail, an identifier that uses a predetermined scheme that may distinguish an MMT package may be provided through the MMT Package ID.

Package Type indicates the type of package from a position of a content or a service. For example, Package Type may be provided in a manner such as 0—unspecified, 1—Basic Video, 2—Basic Audio, 3—Rich Media, 4—ebook, 5—application, 6—Hybrid Package, and the like. Although 249 package types are additionally definable, a package type may be added based on a scheme that an MMT package producer or a service provider who uses an MMT package distinguishes an MMT package. When 256 package types are insufficient, the number of package types may be extended.

Name is a name of an MMT package through which the user may identify the MMT package. Description is a field that provides a user with information associated with an MMT package, and may provide information such as a genre of the MMT package, a summary, a provider, and the like. Description may be provided in multiple languages.

AudioLanguage and TextLanguage provide information associated with an audio language and a text language used for an MMT package. Multiple languages may be used for the AudioLanguage and TextLanguage.

ParentalRating presents an age of a user that may consume an MMT package, and is used to prevent a user in age unsuitable for the corresponding package from consuming the MMT package.

TargetUserProfile provides a profile of a user who may prefer a predetermined MMT package. For example, young generation, people who live in a predetermined place, or the like may be TargetUserProfile.

Required Device Capability is a capability of a user terminal recommended for consuming an MMT package indicated by the MPCIT, and may include a codec, a memory, a CPU speed, a device screen size, and the like.

List of Assets provides information associated with assets forming an MMT package indicated by the MPCIT. List of Assets has Asset ID and MACIT Info as sub elements.

Asset ID is an identifier of assets forming an MMT package, and MACIT INFO is information associated with MACIT corresponding to the assets. The MACIT is shown in Table 3. Information provided in MACIT Info may be an MACIT identifier, MACIT transmission information, and the like. PrivateExt and <Proprietary Elements> are elements used when a business operator or an MMT package producing company, or a producer producing the MPCIT desires to provide predetermined information.

Table 3 shows an example of an MACIT.

TABLE 3

| Name | Description | Data Type |
|---|---|---|
| MACIT | MMT Asset Configuration information | |
| id | ID of MACIT | |
| version | Version of MACIT The newer version overrides the older one as soon as it has been received. | |
| MACIT Transmission info | MACIT transmission information having StartTime or Retransmission Period | |
| StartTime | Starting Time of MACIT Transmission | |
| Retransmission Period | Retransmission time of MACIT | |
| MMT Asset ID | The globally unique identifier identifying MMT Asset | |
| Asset Type | Allowed values are: 0—unspecified 1—Basic Video 2—Basic Audio 3—Rich Media 4—ebook 5—application 6—text 7—HTML 8—255 reserved for future use | |
| Name | Name of the asset | |
| Description | Description, possibly in multiple languages | |
| AudioLanguage | Audio language used in asset | |
| TextLanguage | Textual language used in asset | |
| ParentalRating | The ParentalRating of assete | |
| TargetUserProfile | Profile attributes of the users whom the asset is targeting at | |
| Required Device Capability | Required Device Capability for asset consumption | |
| List of component | List of component which belongs to an Asset It has Asset ID and MACIT info. | |
| Component INFO | Information of component in asset | |
| Private Ext | An element serving as a container for proprietary or application-specific extensions | |
| <proprietary elements> | Proprietary or application-specific elements that are not defined in here | |

The MACIT shown in Table 3 is a table that provides composition information associated with an MMT asset. The information provided from the MACIT is information associated with the MACIT and composition information associated with an MMT asset. The information associated with the MACIT is a MACIT identifier (ID), a MACIT version, and MACIT transmission information (MACIT Transmission Info).

The identifier (ID) of the MACIT may be globally unique, may be unique only within a range of a provider providing the MACIT, and may be unique only within a transmission network. An effective range of the MACIT may be determined based on the purpose of use. The MACIT Transmission Info provides information required for transmitting the MACIT. The MACIT Transmission Info includes StartTime and Retransmission Period, as two sub-elements.

StartTime provides an initial transmission time of the MACIT. Retransmission Period indicates a period in which the MACIT is transmitted after the initial transmission time indicated by StartTime. Therefore, Retransmission Period enables a user terminal to determine when the user terminal is to receive the MACIT.

The composition information associated with the MMT asset includes information associated with an identifier, a type, a name, a description, voice information, and text information of an asset, viewer protection, target user information, information associated with requirements of a device required for consuming an MMT package, and information associated with elements forming the MMT asset. The MMT asset may be formed of a single multimedia component or a plurality of multimedia components.

Examples of an asset formed of a single multimedia component include a video asset, an audio asset, a text asset, a figure asset, or the like. Examples of an asset formed of a plurality of components include a basic layer and an enhanced layer of a video content generated through Scalable Video Coding (SVC), an audio set formed of multiple languages, a single page formed through various multimedia sources such as a web page, and the like.

The MMT Asset ID is an identifier of the MMT asset of which composition information is provided through the MACIT. The MMT Asset ID may be allocated by an asset producer or may be allocated by a service provider who uses an asset. Also, the effective range of the MMT Asset ID may be globally unique, may be locally unique, or may be unique for each provider. Although an identifier allocation system to achieve the above descriptions is not described in detail, an identifier that uses a predetermined scheme that may distinguish an MMT asset may be provided through the MMT Asset ID.

Asset Type indicates an asset type from a perspective of content or a service. For example, Asset Type may be provided in a manner such as 0—unspecified, 1—Basic Video, 2—Basic Audio, 3—Rich Media, 4—ebook, 5—application, 6—text, 7—HTML, or the like. There are 248 asset types that are defined to be additionally provided. An asset type may be added based on a scheme that an asset producer or a service provider who uses an asset distinguishes an asset. When 256 asset types are insufficient, the number of asset types may be extended.

Name is a name of an asset in an MMT package through which the user may identify the asset. Description is a field that provides a user with information associated with an asset, and may provide information such as a type, a genre of the asset, a summary, a provider, and the like. Description may be provided in multiple languages.

AudioLanguage and TextLanguage provide information associated with an audio language and a text language used for an asset. Multiple languages may be used for the AudioLanguage and TextLanguage.

ParentalRating presents an age of a user who may consume an asset, and it is designed to prevent a user in age unsuitable for the asset from consuming the corresponding asset.

TargetUserProfile provides a profile of a user who may prefer a predetermined MMT asset. For example, the young generation, people who live in a predetermined place, or the like may be TargetUserProfile.

Required Device Capability is a required capability of a device for consuming an MMT asset indicated by the MACIT, and may include a codec, a memory, a CPU speed, a device screen size, and the like.

List of components provides information associated with multimedia components forming an MMT asset indicated by the MPCIT. Component Info may be a field that provides substantial information associated with multimedia components, and may include a name of a component, a format, a type, information required in a component level which is a required capability for reproduction of a component, and the like. PrivateExt and <Proprietary Elements> are elements used when a business operator, an MMT asset producing company, or a producer producing the MACIT desires to provide predetermined information.

Table 4 shows an example of an MAIT.

TABLE 4

| Name | Description | Data Type |
|---|---|---|
| MAIT | MMT Access Information Table | |
| id | ID of MAIT | |
| version | Version of MAIT | |
| MAIT Transmission info | MAIT transmission information having StartTime or Retransmission Period | |
| StartTime | Starting Time of MAIT Transmission | |
| Retransmission Period | Retransmission time of MAIT | |
| List of Packages or Assets | List of Packages or Assets that a client can access through the information of MAIT | |
| Access Type | Defines the type of access. Contains the following elements: BroadcastDelivery UnicastDelivery HybridDelivery | |
| BroadcastDelivery | It is used for the indication of Broadcast Network. It contains Network Type and SessionDescription | |
| NetworkType | Type of network It has the following information: Type Version | |
| Type | Type of network, possible values: 0—Broadcasting network such as DVB-T, ISDT-T, ATSC 1—Mobile Broadcast network such as DVB NGH, DMB, and so on 2—255 reserved for future use | |
| Version | Version of network | |
| Session Description | Information about Session Description for Broadcast Network | |
| Unicast Delivery | It is used for the indication of Unicast Network It has the information of Network type, AccessURL and SessionDescription | |
| type | Specifies transport mechanism that is used for this access 0—MMT D 1—HTTP 2—RTP 3—255 Reserved for future use | |
| Access URL | URL which the client can use to construct the URL to receive MMT Package or Asset | |
| Session Description | Information about Session Description for Unicast Network | |
| Hybrid Access info | Information of hybrid network It has the following Elements: Broadcast Unicast | |
| Broadcast | BroadcastNetwork Information and Package/Asset list | |
| Unicast | UnicastNetwork Information and Package/Asset List | |
| DCAS system | Information of Downloadable CAS system | |
| DCAS Type | Identifies D- CAS type Possible values: 0—255 To be defined | |
| DCASServer Address | Address of DCAS server where a client get certificated | |
| Private Ext | An element serving as a container for proprietary or application-specific extensions | |

TABLE 4-continued

| Name | Description | Data Type |
|---|---|---|
| <proprietary elements> | Proprietary or application-specific elements that are not defined in this specification These elements may further contain sub-elements or attributes. | |

The MAIT shown in Table 4 is a table that provides information through which an MMT package and an asset are obtained. The MAIT provides information associated with the MAIT and access information associated with a network through which an MMT package and an asset are provided. The information associated with the MAIT includes a MAIT identifier (ID), and a MAIT version, and MAIT transmission information (MAIT Transmission Info).

The ID of the MAIT may be globally unique, may be unique only within a range of a provider providing the MAIT, and may be unique only within a transmission network. An effective range of the MAIT may be determined based on a purpose of use.

The MAIT Transmission Info provides information required for transmitting the MAIT. The MAIT Transmission Info includes StartTime and Retransmission Period, as two sub-elements. StartTime provides an initial transmission time of the MAIT. Retransmission Period indicates a period in which the MAIT is transmitted after the initial transmission time indicated by StartTime. That is, Retransmission Period enables a user terminal to determine when the user terminal is to receive the MAIT.

List of Packages or Assets indicates MMT packages and assets accessible through the MAIT. A single MAIT may provide access information for a single MMT package or a single asset, or may provide access information for a plurality of MMT packages or assets. In a case in which access information for the plurality of MMT packages or assets is provided, it may be used to prevent double-provision of an MAIT when a single service provider provides a plurality of MMT packages or assets.

Access Type provides information associated with a type of access to the MMT package or asset provided in List of Packages or Assets. Access Type may have three types, that is, BroadcastDelivery, UinicastDeliver, and HybridDelivery. BroadcastDelivery refers to a case in which an MMT package or an asset is transmitted through a broadcasting channel, and provides SessionDescription that is information associated with a session which is a logical path through which a network type, an MMT package, or an asset is transmitted.

NetworkType indicates a broadcasting network that is used among broadcasting-dedicated networks (for example, ATSC which is the terrestrial broadcasting standard in the U.S., DVB which is the terrestrial broadcasting standard in Europe, and ISDB-T which is the terrestrial broadcasting standard in Japan), and a version of the broadcasting network.

Also, when the MMT package or asset is transmitted through a portable broadcasting network (for example, DVB-NGH, ISDB T2, ATSC M/H, and CMMB), the type of the portable broadcasting network and version information may be provided. In addition to the broadcasting network or a portable broadcasting network, information associated with a satellite broadcasting network or other broadcasting-dedicated networks may be added.

SessionDescription may be used for providing information apart from information associated with a physical layer of a broadcasting network. For example, when providing an IP-based broadcasting network, information may be provided based on a Session Description Protocol (SDP) scheme defined in IETE, or information required for access to an MMT package or asset may be provided based on a scheme defined in each broadcasting standard association.

UnicastDelivery provides a type of a network that may access an MMT package or asset, AccessURL that provides an address of a server, and sessionDescription information that is information associated with a session which is a logical path between a server and a client. A role of SessionDescription is the same as SessionDescription described in BroadcastDelivery.

Information associated with a protocol used when the server transmits an MMT package or asset may be obtained through UnicastDelivery. The protocol may include the protocol of MMT D.2 defined in the MMT standard, HTTP, RTP, FTP, and the like. Access URL provides an address of a server from which an MMT package or asset is obtained through a unicast network.

Hybrid Access Info provides access information for a case where an MMT package or asset is delivered through a hybrid network environment. Here, a hybrid network environment refers to an environment where at least two heterogeneous networks are used for transmitting an MMT package or an asset.

HybridAccessInfo has Broadcast and Unicast as two sub elements. Broadcast provides information associated with a broadcasting network among the hybrid network and information associated with an MMT package or asset transmitted through the broadcasting network, using BoradcastDelivery. Unicast provides information associated with a unicast network among the hybrid network and information associated with an MMT package or asset transmitted through the unicast network, using UnicastDelivery.

One of the pieces of information provided by the MAIT is related to a Downloadable Conditional Access System (DCAS). DCAS refers to CAS that is not installed in a terminal, and is downloaded and used when needed.

The CAS is generally directly mounted on a terminal, but may be downloaded by an efficient method capable of supporting various CAS solutions. The DCAS solution does not belong to the scope of the present invention, so a detailed description thereof will be omitted.

A method for providing information associated with the DCAS through the MAIT when the DCAS is used for an MMT system will be provided. The DCAS has DCAS Type and DCASServerAddress as sub elements. DCAS Type indicates the type of a CAS solution that is used, and DCAServerAddress indicates an address of a server from which the CAS solution and necessary security materials are received.

PrivateExt and <Proprietary Elements> are elements used when a business operator, an MMT asset producing company, or a producer producing the MAIT desires to provide predetermined information.

Table 5 shows an example of a DCIT.

TABLE 5

| Name | Description | Data Type |
|---|---|---|
| DCIT | Device Capability Information Table Contains the following elements: | |

TABLE 5-continued

| Name | Description | Data Type |
|---|---|---|
| | Video | |
| | Audio | |
| | DownloadFile | |
| | Rich Media | |
| id | ID of DCIT | |
| version | Version of DCIT | |
| DCIT Transmission info | DCIT transmission information having StartTime or Retransmission Period | |
| StartTime | Starting Time of DCIT Transmission | |
| Retransmission Period | Retransmission time of dcIT | |
| List of Package or Asset | List of Package or Asset that recommend the capabilities in DCIT | |
| Video | Video codec capability related requirements Contains the following elements: MIMEType, CODEC and Complexity | |
| MIMEType | MIME Media type of the video If the complexities that can be derived from the MIMEType element and the codec parameters below differ from the parameters defined under the 'Complexity' element below, then the parameters defined under the 'Complexity' element SHALLtake priority. Contains the following attribute: codec | |
| codec | The codec parameters for the associated MIME Media type If the MIME type definition specifies mandatory parameters, these MUST be included in this string. Optional parameters containing information that can be used to determine as to whether the terminal can make use of the media SHOULD be included in the string. | |
| Complexity | The complexity the video decoder has to deal with It is RECOMMENDED that this element is included if the complexity indicated by the MIME type and codec parameters differs from the actual complexity. Contains the following elements: Bitrate Resolution MinimumBufferSize | |
| Bitrate | The total bit-rate of the video stream Contains the following attributes: average maximum | |
| average | The average bit-rate in kbit/s | |
| maximum | The maximum bit-rate in kbit/s | |
| Resolution | The resolution of the video Contains the following attributes: horizontal vertical temporal | |
| horizontal | The horizontal resolution of the video in pixels | |
| vertical | The vertical resolution of the video in pixels | |
| temporal | The maximum temporal resolution in frames per second. | |
| MinimumBuffer Size | The minimum decoder buffer size needed to process the video content in kbytes | |
| Audio | The audio codec capability Contains the following elements: MIMEType Complexity | |
| MIMEType | MIME Media type of the audio If the complexities that can be derived from the MIMEType element and the codec parameters below differ from the parameters defined under the 'Complexity' element below, then the parameters defined under the 'Complexity' element SHALL take priority. | |
| | Contains the following attribute: codec | |
| codec | The codec parameters for the associated MIME Media type If the MIME type definition specifies mandatory parameters, these MUST be included in this string. Optional parameters containing information that can be used to determine as to whether the terminal can make use of the media SHOULD be included in the string. | |
| Complexity | The complexity the audio decoder has to deal with It is RECOMMENDED that this element is included if the complexity indicated by the MIME type and codec parameters differs from the actual complexity. Contains the following elements: Bitrate MinimumBufferSize | |
| Bitrate | The total bit-rate of the audio stream Contains the following attributes: average maximum | |
| average | The average bit-rate in kbit/s | |
| maximum | The maximum bit-rate in kbit/s | |
| MinimumBuffer Size | The minimum decoder buffer size needed to process the audio content in kbytes | |
| DownloadFile | The required capability for the download files Contains the following elements: MIMEType | |
| MIMEType | Assuming a download service consists of a set of files with different MIME types which together make up the service, the terminal must support all of these MIME types in order to be able to present the service to the user. Contains the following attribute: codec | |
| codec | The codec parameters for the associated MIME Media type If the file's MIME type definition specifies mandatory parameters, these MUST bei ncluded in this string. Optional parameters containing information that can be used to determine as to whether the terminal can make use of the file SHOULD be included in the string. | |
| RichMedia | Indicates which RichMedia solution is used and what the requirement is. | |
| PrivateExt | An element serving as a container for proprietary or application-specific extensions | |
| <proprietary elements> | Proprietary or application-specific elements that are not defined in this specification These elements may further contain sub-elements or attributes. | |

The DCIT shown in Table 5 is a table for providing a capability of a device (device capability) recommended for consuming an MMT package/asset. The DCIT provides information associated with the DCIT and information required for consuming an MMT package/asset. Information associated with the DCIT is DCIT ID, DCIT version, and DCIT transmission information (DCIT Transmission Info).

The ID of the DCIT may be a globally unique, may be unique within a range of a provider that provides the DCIT, or may be unique within a transmission network. An effective range of the DCIT may be determined based on a purpose of use. The DCIT Transmission Info provides information required for transmitting the DCIT. DCIT Transmission Info has StartTime and Retransmission Period as two sub-elements.

StartTime provides an initial transmission time of the DCIT, and Retransmission Period indicates a period in which the DCIT is transmitted after the initial transmission time indicated by StartTime. Therefore, it may enable a user terminal to determine when the user terminal is to receive the DCIT.

DCIT provides a device capability for consuming video data and audio data, a device capability for downloading a file, and a device capability for consuming rich media. The terminal may determine whether it is possible to consume an MMT package/asset satisfying the DCIT based on the information provided by the DCIT.

List of Package or Asset provides an ID of an MMT package/asset that requires the device capability provided by the DCIT, or IDs of an MPCIT and an MACIT that provide the configuration information of the MMT package/asset.

The device capability for video data may be basically provided in MIME Type. MIME is an abbreviation of Multipurpose Internet Mail Extensions[IETF RFC 822, 2822, 5322], and refers to a technique that may provide attributes of a multimedia content. Information provided from MIME Type may be formed from a codec used for video data and profile information of the codec.

However, the information may be changed due to a change of hardware or systematic limitations at a point in time of actually being provided to a user. The changed information is provided by a Complexity element.

Complexity has Bitrate, Resolution, and MinumimBufferSize as sub-elements. Bitrate is information associated with a bit rate of a video stream, and provides an average bit rate and a maximum bit rate to achieve a smooth operation of a decoder (especially, a memory-related operation). Resolution provides horizontal resolution and vertical resolution of video data with pixels, and provides information associated with temporal resolution regarding the number of reproduced frames per hour. MinimumBufferSize refers to a minimal size of a decoder buffer that is required to process a video content.

Also, the device capability for audio data is basically provided by MIMEType. The device capability for the audio provided by MIMEType is formed from a codec used for the audio and profile information of the codec. However, the information may be changed due to a change of hardware or systematic limitations at a point in time of actually being provided to a user. The changed information is provided by a Complexity element.

Complexity has Bitrate and MinumimBufferSize as sub elements. Bitrate is information associated with a bit rate of an audio stream, and provides an average bit rate and a maximum bit rate to achieve a smooth operation of a decoder (especially, a memory-related operation). MinimumBufferSize refers to a minimal size of a decoder buffer required for processing an Audio content. DownloadFile provides a device capability required for an asset and package in a file type.

In general, a service in a file type is formed of various multimedia contents in a hybrid manner. The composition information is also provided by MIMEType, and necessary codec information is separately provided. RichMedia is a field for providing a device capability for consuming a RICH Media content. The RICH Media content provides a user with a new service experience through interaction with the user, and LaSER of MPEG, BIMS of 3GPP, SVG-T of W3C, or the like are representative technologies. In addition, as non-standard technologies, FLASH of adobe or the like may be included. The Rich Media field provides a technique for producing the Rich Media content and requirements, and may use MIME techniques.

PrivateExt and <Proprietary Elements> are elements used when a business operator or an MMT package producing company, or a producer producing the DCIT desires to provide predetermined information.

Figure 7:
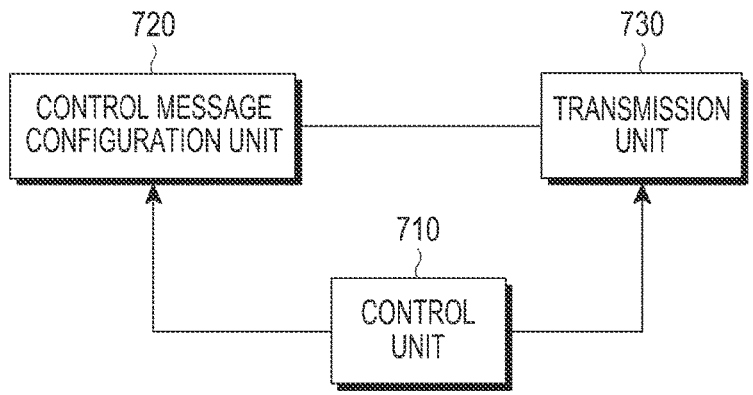
FIG. 7 is a diagram illustrating a configuration of a transmitting apparatus that provides a hybrid content service in a broadcasting system according to an embodiment of the present invention.

FIG. 7 illustrates a configuration of a transmitting apparatus that provides a service of a hybrid content in a broadcasting system according to an embodiment of the present invention. For example, the transmitting apparatus may correspond to a base station that supplies a hybrid content.

Referring to FIG. 7, a control unit 710 executes a general control so as to generate a multimedia frame for providing a service of a hybrid content, and to transmit the same through a hybrid network. Here, the multimedia frame is formed of a header and a payload. The header includes header information, and the payload includes multimedia data. For example, the header information includes a frame identifier, a quality of service, performance measurement information, and the like.

Also, the control unit 710 executes a general control so as to provide a receiving apparatus with information associated with generation and consumption of a hybrid content and information associated with transmission of a hybrid content.

For example, the control unit 710 executes a control so as to configure a control message (for example, 'Layer C1 message') that provides information associated with generation and consumption of a hybrid content, and to transmit the same to the receiving apparatus.

To this end, the control unit 710 determines a type of information to be recorded in an optional field of the control message based on a message type of the message to be transmitted. The message type may be one of MMT package/asset information, MMT configuration information, full composition information, and partial composition information.

The information recorded in the optional field of the control message may be defined in of FIGS. 6B to 6E, for each message type.

When the message type for providing MMT package/asset information is selected, the control unit 710 executes a control to configure a payload of the control message based on a table selected from among tables associated with the MMT package/asset information.

In this example, the tables associated with the MMT package/asset information include an information table required for consuming an MMT package/asset (Table 1), MMT package composition information table (Table 2), an MMT asset composition information table (Table 3), a table for providing information associated with obtaining an MMT package and asset (Table 4), and a table for providing a recommended device capability for consuming an MMT package/asset (Table 5).

Each table has been defined as shown in Table 1 through Table 5.

A control message configuration unit 720 configures a control message that provides information associated with generation and consumption of a hybrid content, based on a control from the control unit 710.

Particularly, the control message configuration unit 720 configures the control message based on a message type determined by the control unit 710. That is, the control message configuration unit 720 sets information to be recorded in an optional field of the control message to correspond to the message type, based on a control of the control unit 710. This has been described in detail in FIGS. 6A to 6E and the descriptions thereof.

For example, when the message type of the control message is determined to be MMT package/asset information, the control message configuration unit 720 records, in an optional field of the control message to be configured, information designating one of the tables defined to be Table 1 through Table 5. A payload of the control message to be configured may be configured based on the selected table.

The transmission unit 730 transmits a control message configured by the control message configuration unit 720 to the receiving apparatus, based on a control of the control unit 710. In this example, the control message may be transmitted through various networks. The various networks through which the control message is transmitted have been described in detail in FIGS. 5A to 5E and the descriptions thereof.

Figure 8:
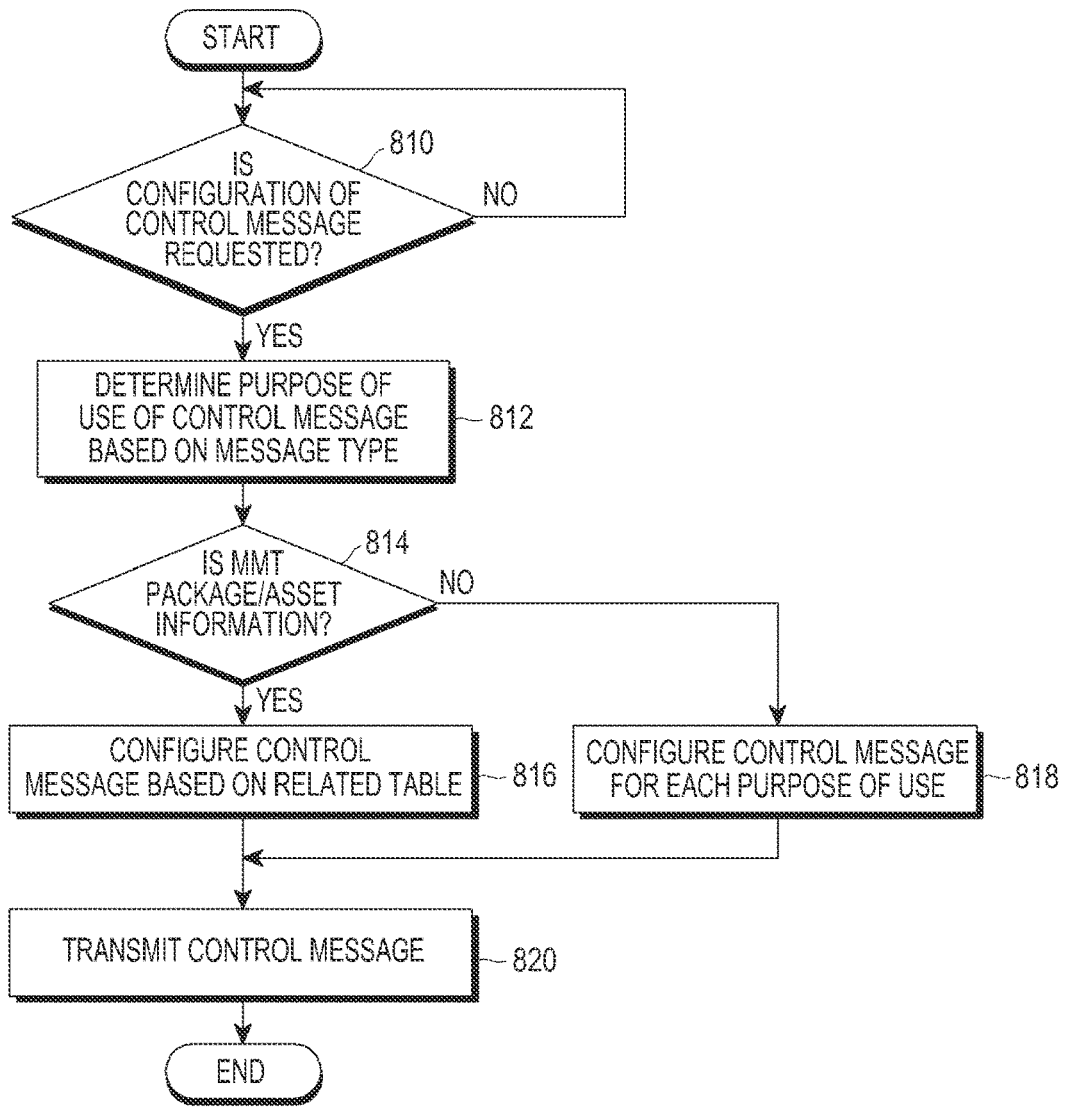
FIG. 8 is a diagram illustrating a flow of a control that is executed in a transmitting apparatus to transmit a control message according to an embodiment of the present invention.

FIG. 8 illustrates a flow of a control executed in a transmitting apparatus to transmit a control message according to an embodiment of the present invention.

Referring to FIG. 8, the transmitting apparatus determines whether configuration of a control message for a hybrid content service is requested through a hybrid network in step 810. For example, the transmitting apparatus monitors whether transmission of a Layer C1 message is requested.

When the request for configuring the control message exists, the transmitting apparatus determines a message type of the requested control message in step 812, and determines the purpose of use of the control message based on the determined message type. The purpose of use of a control message has been described for each message type with reference to FIGS. 6A to 6E.

When the purpose of use of the control message is determined based on the message type, the transmitting apparatus determines whether the purpose of use of the control message is for transmitting the MMT package/asset information in step 814.

When it is determined that the purpose of use of the control message is for transmitting the MMT package/asset information, the transmitting apparatus configures the control message based on related tables defined in advance for transmitting the MMT package/asset information in step 816. In this example, a structure of the configured control message is illustrated in FIG. 6B.

For example, when it is determined that the purpose of use of the control message is for transmitting the MMT package/asset information, the transmitting apparatus records a value corresponding to the purpose of use in a message type field of the control message. Information (Information Table Info) that designates a table selected from among the related tables defined in advance may be set in an optional field of the control message, and a payload of the control message may be configured based on the selected table. The related tables have been defined through Table 1 through Table 5.

Conversely, when it is determined that the purpose of use of the control message is different from transmitting the MMT package/asset information, the transmitting apparatus configures a control message for each defined purpose of use in step 818. The structures of the configured control messages are illustrated in FIGS. 6C through 6E.

When the configuration of the control message for each purpose of use is completed, the transmitting apparatus transmits the configured control message through one from the hybrid network in step 820. Transmission of a control message using one of the hybrid network has been described in detail in FIGS. 5A to 5E and descriptions thereof.

Figure 9:
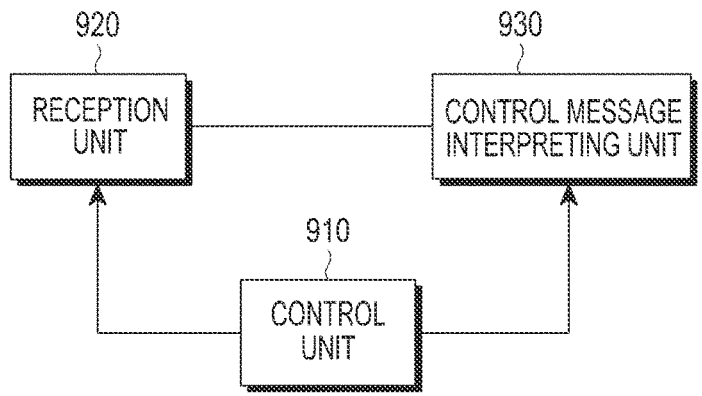
FIG. 9 is a diagram illustrating a configuration of a receiving apparatus that provides a hybrid content service in a broadcasting system according to an embodiment of the present invention.

FIG. 9 illustrates a configuration of a receiving apparatus that provides a service of a hybrid content in a broadcasting system according to an embodiment of the present invention. For example, the receiving apparatus may correspond to a user terminal that provides a hybrid content to a user.

For example, the user terminal may be any terminal that is capable of using a hybrid content such as a digital television, a smart phone, a computer, and the like, and a type of the terminal may not be limited.

Referring to FIG. 9, a control unit 910 executes a general control so as to receive a multimedia frame for providing a service of a hybrid content, and to provide a user with a desired content service based on the received multimedia frame.

To this end, the control unit 910 may receive related control information from a transmitting apparatus, and may provide a corresponding service based on the received control information. For example, the control unit 910 needs to be provided with information associated with generation and consumption of a hybrid content and information associated with transmission of a hybrid content, from the transmitting apparatus, so as to control a content service. The control unit 910 may control a reception unit 920 and a control message interpreting unit 930, so as to obtain the control information.

The control unit 910 may execute a control, so as to provide a desired content service from a hybrid content recorded in the received multimedia frame, based on the control information obtained through the control message interpreting unit 930.

For example, the control information may be obtained by the control message interpreting unit 930 from a control message (for example, the 'Layer C1 message') received through the reception unit 920. A type of the information recorded in an optional field of the control message may be defined based on a type of the control message.

Therefore, the control message interpreting unit 930 determines a message type field of the received control message so as to promptly obtain desired control information. For example, to obtain one control information from among MMT package/asset information, MMT configuration information, full composition information, and partial composition information, the control message interpreting unit 930 selectively interprets a control message of which a message type field records information associated with a message type corresponding to the desired control information.

FIGS. 6B to 6E show a configuration of a control message for each message type. That is, FIGS. 6B to 6E define information recorded in an optional field forming a control message for each message type.

For example, when a message type is a control message for providing MMT package/asset information, information associated with a type of a selected related table used for configuring MMT package/asset information from among related tables defined in advance may be recorded in an optional field of the corresponding control message. In a payload of the corresponding control message, MMT package/asset information configured by the selected related table may be recorded. A structure of the control message of which the message type is for providing MMT package/asset information is illustrated in FIG. 6B.

The tables related to the MMT package/asset information include an information table required for consuming an MMT package/asset (Table 1), an MMT package composition information table (Table 2), an MMT asset composition information table (Table 3), a table for providing information associated with obtaining an MMT package and asset (Table 4), and a table for providing a recommended device capability for consuming an MMT package/asset (Table 5).

Each table has been defined as shown in Table 1 through Table 5.

The reception unit 920 receives a multimedia frame and various control messages from the transmitting apparatus through a hybrid network, based on a control of the control unit 910. For ease of description, descriptions associated with a configuration for processing a multimedia frame will be omitted.

The reception unit 920 receives a control message such as a Layer C1 message or the like based on a control of the control unit 910, and transfers the same to the control message interpreting unit 930. The hybrid network through which the control message is transmitted has been described in detail in FIGS. 5A to 5E and the descriptions thereof.

The control message interpreting unit 930 interprets the control message received through the reception unit 920, based on a control of the control unit 910. For example, when a message type of a control message to be received is designated by the control unit 910, the control message interpreting unit 930 selects a desired control message based on information recorded in a message type field of a control message provided from the reception unit 920.

When a desired type of control message is selected, the control message interpreting unit 930 interprets the selected control message so as to obtain desired control information. When providing a Layer C1 message, control information obtainable for each message type is defined in FIGS. 6B to 6E.

In particular, FIG. 6B shows a structure of a control message of which a message type is for providing MMT package/asset information. When providing a control message of which a message type is for providing MMT package/asset information, as shown in FIG. 6B, information associated with a type of a related table used for configuring MMT package/asset information is recorded in an optional field. Related tables that may be used for configuring the MMT package/asset information are defined in Table 1 through Table 5. The tables defined by Table 1 through Table 5 describe control information that may be transferred through a payload of a control message in detail.

The control message interpreting unit 930 provides the control unit 910 with control information obtained from a designated type of control message, so that the control unit 910 executes a control to provide a user with a service of a desired content based on a multimedia frame.

Figure 10:
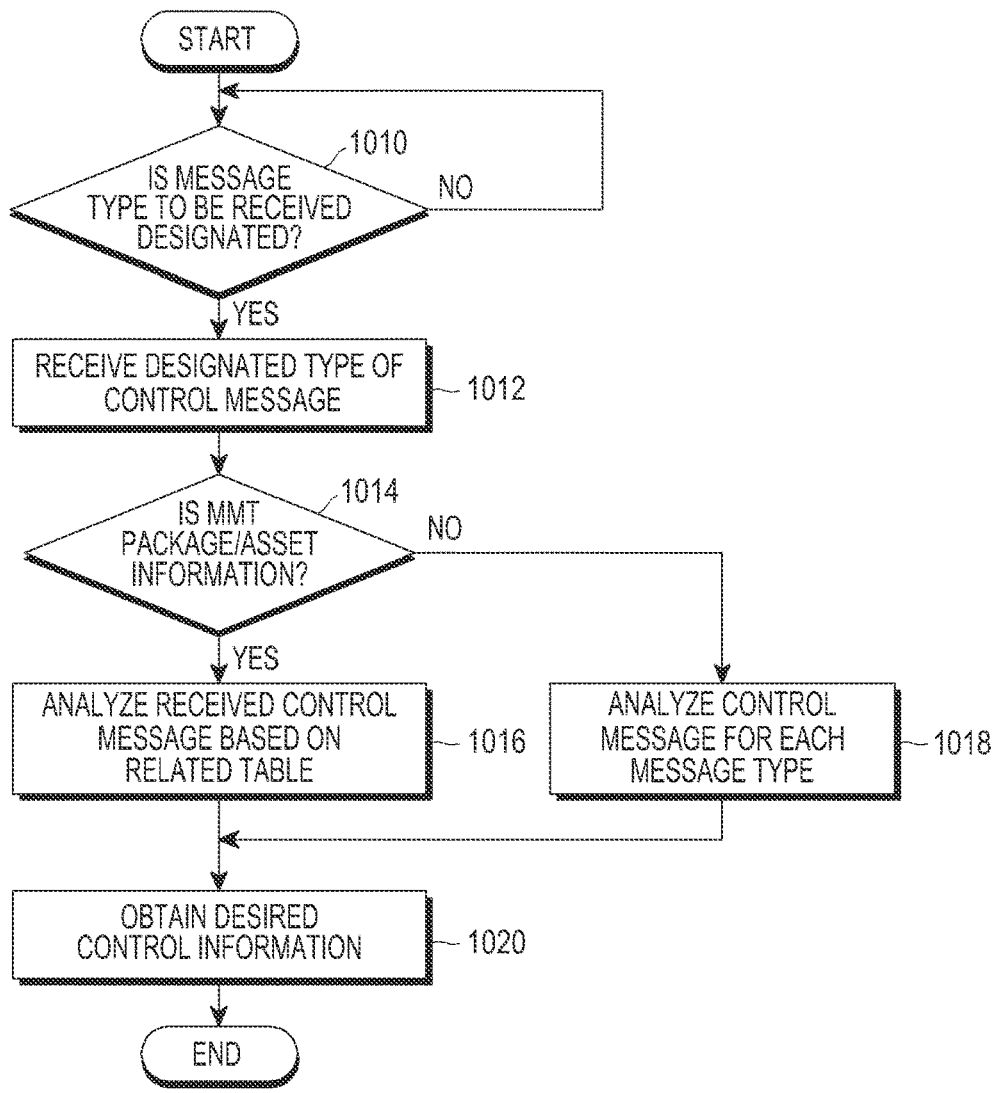
FIG. 10 is a diagram illustrating a flow of a control that is executed in a receiving apparatus to receive a control message according to an embodiment of the present invention.

FIG. 10 illustrates a flow of a control executed in a receiving apparatus to transmit a control message according to an embodiment of the present invention.

Referring to FIG. 10, a receiving apparatus designates a message type of a received message in step 1010. For example, the message type may be designated based on control information required from among MMT package/asset information, MMT configuration information, full composition information, and partial composition information. A structure of a control message for each message type has been illustrated in detail in FIGS. 6A to 6E.

When a message type of a message to be received is designated, the receiving apparatus selects a designated type of control message from among received control messages in step 1012. The selection of the control message may be executed by determining information recorded in a message type field of the received control message, and determining whether the determined information corresponds to the designated message type.

When the desired message type of control message is received, the receiving apparatus determines whether the designated message type is a message type for providing MMT package/asset information in step 1014.

When the control message of which the designated message type is for providing MMT package/asset information is received, the receiving apparatus proceeds with step 1016. Conversely, when the designated message type is different from a type for providing MMT package/asset information, the receiving apparatus proceeds with step 1018. For example, a different message type corresponds to a message type that provides one of MMT configuration information, full composition information, and partial composition information.

In step 1016, the receiving apparatus obtains information associated with a type of a related table recorded in an optional field of the selected control message, and obtains MMT package/asset information recorded in a payload of the selected control message using the obtained information associated with the type of the related table.

The tables related to the MMT package/asset information include an information table required for consuming an MMT package/asset (Table 1), an MMT package composition information table (Table 2), an MMT asset composition information table (Table 3), a table for providing information associated with obtaining an MMT package and asset (Table 4), and a table for providing of a recommended device capability for consuming an MMT package/asset (Table 5).

The receiving apparatus may obtain desired control information in association with MMT package/asset information, through the related table. The control information obtained from the related table is disclosed in detail through Table 1 through Table 5 and the descriptions thereof.

When step 1018 is executed, the receiving apparatus analyzes a control message corresponding to a message type for obtaining control information excluding MMT package/asset information. Examples of the control message corresponding to the message type for obtaining other control information have been disclosed in FIGS. 6C to 6E and the descriptions thereof.

The receiving apparatus obtains the control information in step 1020 based on a result of analyzing in step 1016 or step 1018. The receiving apparatus receives a multimedia frame based on the obtained control information, and supports a desired content service by a hybrid content provided through the received multimedia frame.

It may be appreciated that the embodiments of the present invention can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium.

A web widget manufacturing method of the present invention can be realized by a computer or a portable terminal including a controller and a memory, and it can be seen that the memory corresponds to an example of the storage medium which is suitable for storing a program or programs including instructions by which the embodiments of the present invention are realized, and is machine readable. Accordingly, the present invention includes a program for a code implementing the apparatus and method described in the appended claims of the specification and a machine (a computer or the like)-readable storage medium for storing the program. Further, the program may be electronically transferred by any communication signal through a wired or wireless connection, and the present disclosure appropriately includes equivalents of the program.

In addition, the content providing apparatus and method may receive the program from a program providing apparatus connected either through a wire or wirelessly and store the received program. The program supply apparatus may include a program that includes instructions to execute the exemplary embodiments of the present invention, a memory that stores information or the like required for the exemplary embodiments of the present invention, a communication unit that conducts wired or wireless communication with the electronic apparatus, and a control unit that transmits a corresponding program to a transmission/reception apparatus in response to the request from the electronic apparatus or automatically.

The invention claimed is:

1. A method of transmitting a signaling message based on a motion pictures experts group (MPEG) media transport (MMT) protocol, the method comprising:
    identifying a plurality of tables, the plurality of tables comprising signaling information required for consuming a content package;
    generating a signaling message based on the plurality of tables, the signaling message comprising a payload, length information and extension information; and
    transmitting the signaling message,
    wherein the payload includes the plurality of tables,
    wherein the length information indicates a length of the signaling message,
    wherein the extension information includes information on the plurality of tables included in the payload,
    wherein the information on the plurality of tables comprises table identifier information and table version information for each of the plurality of tables,
    wherein the length information and the extension information are located before the payload, and
    wherein one of the plurality of tables is a device capability information table (DCIT) including information on device capabilities for consuming the content package.

2. The method as claimed in claim 1, wherein the one of the plurality of tables includes location information on the content package.

3. The method as claimed in claim 1, wherein the one of the plurality of tables includes composition information of the content package.

4. The method as claimed in claim 1, wherein the DCIT comprises:
    an identifier of the DCIT;
    version information of the DCIT;
    complexity information for video data; and
    complexity information for audio data.

5. A method of receiving a signaling message based on a motion pictures experts group (MPEG) media transport (MMT) protocol, the method comprising:
    receiving a signaling message, the signaling message being generated based on a plurality of tables and the plurality of tables comprising signaling information required for consuming a content package; and
    identifying the plurality of tables included in the signaling message,
    wherein the signaling message comprises a payload, length information and extension information,
    wherein the payload includes the plurality of tables,
    wherein the length information indicates a length of the signaling message,
    wherein the extension information includes information on the plurality of tables included in the payload,
    wherein the information on the plurality of tables comprises table identifier information and table version information for each of the plurality of tables,
    wherein the length information and the extension information are located before the payload, and
    wherein one of the plurality of tables is a device capability information table (DCIT) including information on device capabilities for consuming the content package.

6. The method as claimed in claim 5, wherein the one of the plurality of tables includes location information on the content package.

7. The method as claimed in claim 5, wherein the one of the plurality of tables includes composition information of the content package.

8. The method as claimed in claim 5, wherein the DCIT comprises:
    an identifier of the DCIT;
    version information of the DCIT;
    complexity information for video data; and
    complexity information for audio data.

* * * * *